(12) United States Patent
Kawasaki et al.

(10) Patent No.: US 8,602,933 B2
(45) Date of Patent: *Dec. 10, 2013

(54) POWER TRANSMISSION DEVICE AND POWER TRANSMISSION SYSTEM

(75) Inventors: Koji Kawasaki, Anjo (JP); Takenori Matsue, Anjo (JP); Yuji Tokudome, Okazaki (JP)

(73) Assignees: Nippon Soken, Inc., Nishio (JP); Denso Corporation, Kariya (JP)

(*) Notice: Subject to any disclaimer, the term of this patent is extended or adjusted under 35 U.S.C. 154(b) by 273 days.

This patent is subject to a terminal disclaimer.

(21) Appl. No.: 12/848,574

(22) Filed: Aug. 2, 2010

(65) Prior Publication Data

US 2011/0028260 A1 Feb. 3, 2011

(30) Foreign Application Priority Data

Jul. 31, 2009 (JP) ................................. 2009-179547

(51) Int. Cl.
*F16H 3/72* (2006.01)
*F16H 37/06* (2006.01)
*F16H 37/02* (2006.01)

(52) U.S. Cl.
USPC ............ 475/5; 475/210; 475/211; 180/65.21; 180/65.25; 180/65.6; 903/918; 903/945

(58) Field of Classification Search
USPC .............................................. 475/210, 211, 5
See application file for complete search history.

(56) References Cited

U.S. PATENT DOCUMENTS

| 5,643,131 | A | * | 7/1997 | Kuhn et al. ................... 475/210 |
| 6,447,422 | B1 | * | 9/2002 | Haka .............................. 475/211 |
| 7,172,524 | B2 | * | 2/2007 | Moeller ............................. 475/5 |
| 7,347,800 | B2 | * | 3/2008 | Jackson ......................... 475/210 |
| 2006/0276295 | A1 | * | 12/2006 | Gitt ............................... 475/210 |
| 2008/0236917 | A1 | | 10/2008 | Abe et al. |
| 2010/0120579 | A1 | * | 5/2010 | Kawasaki ........................ 477/3 |
| 2011/0118075 | A1 | * | 5/2011 | Kawasaki et al. ............. 475/331 |
| 2011/0118077 | A1 | * | 5/2011 | Kawasaki et al. ................ 477/3 |
| 2012/0028749 | A1 | * | 2/2012 | Kawasaki et al. ............. 475/211 |

FOREIGN PATENT DOCUMENTS

| JP | A-2001-108073 | 4/2001 |
| JP | A-2006-308034 | 11/2006 |
| JP | A-2008-247192 | 10/2008 |

OTHER PUBLICATIONS

Notification of Reasons for Rejection dated Dec. 10, 2012 from Japanese Patent Application No. 2009-179547 (with English-language translation).

* cited by examiner

*Primary Examiner* — David D Le
*Assistant Examiner* — Colby M Hansen
(74) *Attorney, Agent, or Firm* — Oliff & Berridge, PLC

(57) ABSTRACT

A power transmission device includes a planetary gear set and a first and a second connecting mechanism. The planetary gear set receives power from a power source and outputs it to a power-driven member. The first connecting mechanism connects a first and a second rotor of the planetary gear set through a separate path. The second connecting mechanism connects the second rotor and a third rotor of the planetary gear set through a separate path. The controller is operable selectively in a first operation mode in which the second connecting mechanism is engaged, while the first connecting mechanism is disengaged and a second operation mode in which the second connecting mechanism is engaged, while the first connecting mechanism is disengaged. This ensures suitable mechanical connections among the power source, the power-driven member, and the power split mechanism which match with an operating condition of the power transmission device.

24 Claims, 25 Drawing Sheets

MG-STARTING 1ST OPERATION MODE

ENGINE STARTING 1ST OPERATION MODE

ENGINE TORQUE OUTPUT   1ST OPERATION MODE

HIGH SPEED RANGE   2ND OPERATION MODE

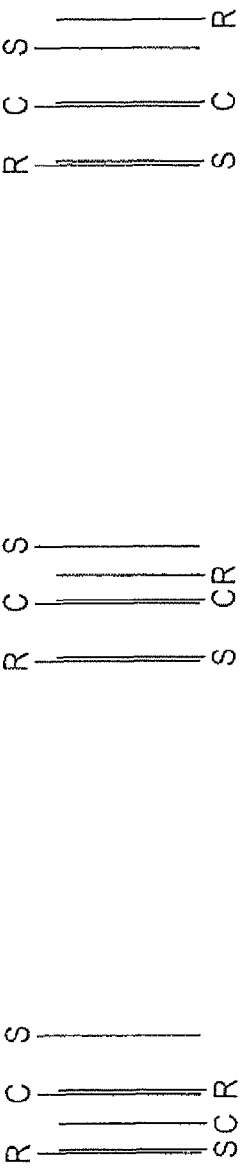
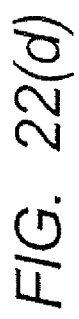
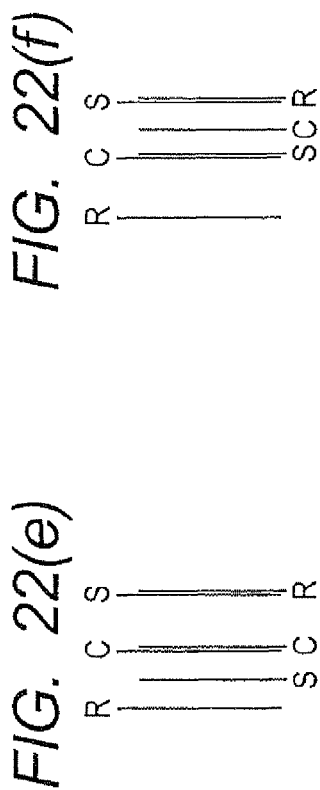
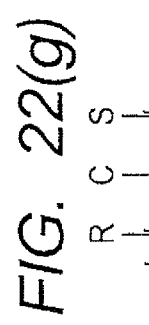
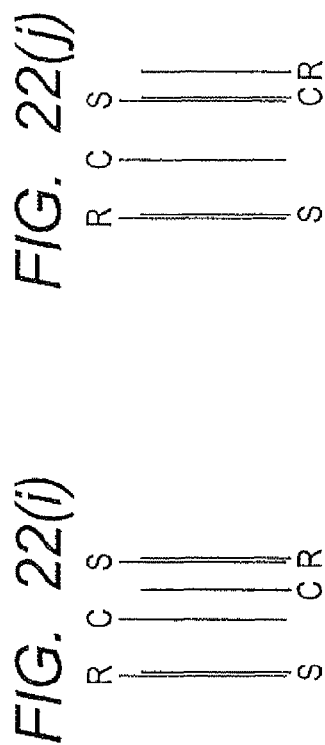

POWER TRANSMISSION DEVICE AND POWER TRANSMISSION SYSTEM

CROSS REFERENCE TO RELATED DOCUMENT

The present application claims the benefits of priority of Japanese Patent Application No. 2009-179547 filed on Jul. 31, 2009, the disclosure of which is incorporated herein by reference.

BACKGROUND OF THE INVENTION

1. Technical Field of the Invention

The present invention relates generally to a power transmission device equipped with a plurality of power split rotors which interlock with each other to transmit power or torque from a power source to a power-driven member, and a power transmission system using the same.

2. Background Art

There are known power transmission devices of the above type for use in hybrid vehicles equipped with a power source implemented by an internal combustion engine and an electric motor, and driven wheels to which the power or torque is transmitted from the power source. For example, the power transmission devices, as used in the hybrid vehicles, typically include a planetary gear train consisting of three rotors: a sun gear, a carrier, and a ring gear to which an electric generator, an internal combustion engine, and an electric motor are connected mechanically. The driven wheels of the vehicle are coupled mechanically to the electric motor. The planetary gear train is so designed that when the torque is applied to the sun gear or the ring gear, it rotates the carrier to turn a rotating shaft of the internal combustion engine, so that the internal combustion engine is started. After start-up of the engine, the torque of the engine is transmitted to the driven wheels through the carrier.

For example, Japanese Patent First Publication No. 2006-308039 discloses the above described type of power transmission device.

The power transmission device, as described above, is so designed that the rotors of the planetary gear train which are connected mechanically to the power source and the driven wheels are fixed, which may result in unsuitable mechanical connections among the power source, the power-driven member, and the power transmission device which leads to mismatching of the gear ratio of a power transmission path between the power source and the power-driven member with running conditions of the vehicle.

SUMMARY OF THE INVENTION

It is, therefore, a principal object of the invention to provide a power transmission apparatus which is equipped with a power split mechanism made up of a plurality of rotors interlocking with each other to transmit power or torque from a power source to a power-driven member and works to establish suitable mechanical connections among the power source, the power-driven member, and the power split mechanism.

According to one aspect of the invention, there is provided a power transmission apparatus which may be employed in hybrid vehicles to transmit power or torque between a power source and a driven wheel. The power transmission apparatus comprises: (a) a power split mechanism equipped with three rotors: a first, a second, and a third rotor which are operable to interlock with each other to split power to be outputted among the first, second, and third rotors and to output the power in the form of rotational energy, one of the first, second, and third rotors working to receive input of power, as produced by a power source in the form of torque, through a mechanical connection therebetween, another one of the first, second, and third rotors working to output the power to a power-driven member through a mechanical connection therebetween, the power transmission mechanism being so designed that a rotational speed of one of the first, second, and third rotors is dependent on those of remaining two of the first, second, and third rotors; (b) a first connecting mechanism which works to establish a mechanical connection between the first and second rotors through a first power transmission path extending independently of the first, second, and third rotors; (c) a second connecting mechanism which works to establish a mechanical connection between the second and third rotors through a second power transmission path extending independently of the first, second, and third rotors; and (d) a controller which works to control transmission of power between the power source and the power-driven member. The controller is operable selectively in a first operation mode and a second operation mode. In the first operation mode, the controller establishes the mechanical connection through the first connecting mechanism while blocking the mechanical connection through the second connecting mechanism. In the second operation mode, the controller establishes the mechanical connection through the second connecting mechanism while blocking the mechanical connection through the first connecting mechanism.

Specifically, the first operation mode and the second operation mode may be switched selectively, thus achieving desirable connections among the power source, the power-driven member, and the rotors of the power split mechanism which match with an operating condition of the power transmission apparatus.

The power split mechanism may have the rotors, one connected to the power source, and another connected to the power-driven member in at least one of the first and second operation modes. In this case, the rotational speed of one of the rotors is dependent on those of the remaining two of the rotors. Therefore, in the at least one of the first and second operation modes, rotational speeds of the first to third rotors are dependent upon those of the power source and the power-driven member.

In the preferred mode of the invention, the power transmission apparatus further comprises a rotating shaft, a first clutch joined directly to the rotating shaft, and a second clutch joined directly to the rotating shaft. The rotating shaft is coupled mechanically to the second rotor of the power split mechanism and works to rotate with rotation of the second rotor The first clutch works to connect the rotating shaft mechanically to the first rotor. The second clutch works to connect the rotating shaft mechanically to the third rotor. The direct mechanical connections of the first and second clutches to the same rotating shaft permits the first and second clutches to be disposed close to each other, thereby facilitating ease of layout of the first and second clutches. In the case where the first and second clutches are of a hydraulic type, it results in ease of designing a hydraulic path and permits the whole of the power transmission apparatus to be reduced in size.

When each of signs of rotational directions of the first and second rotors has a preselected one of positive and negative values, the rotational energies to be outputted from the first and second rotors are opposite in sign to each other in the first operation mode, while the rotational energies to be outputted from the second and third rotors are identical in sign with each other in the second operation mode or zero. Referring to FIG. 6($a$), the first rotor is the sun gear S of the second planetary gear set 24. The second rotor is the carrier C of the second planetary gear set 24. The third rotor is the carrier C of the first planetary gear set 22. The power transmission mechanism is so designed that when the signs of rotational directions of the sun gear S and the carrier C of the second planetary gear set 24 are set to one of the positive and negative values, the rotational energy or power to be outputted from the carrier C of the first planetary gear set 22 and that to be outputted from the carrier C of the second planetary gear set 24 are identical in sign with each other or zero (0). This enables the engine 12 is to be started in the second operation mode.

Specifically, in the first operation mode, the rotational energies to be outputted from the first and second rotors are opposite in sign to each other, thus resulting in circulation of the energy. The circulation of the energy has the advantage that the so-called geared neutral can be achieved in which the speed of the third rotor is zero (0) even when absolute values of speeds of the first and second rotors are greater than zero (0), but also has the disadvantage that the energy efficiency is decreased. Accordingly, when the disadvantage become pronounced, it is unadvisable to use the first operation mode. In the second operation mode, the power is not circulated between the second and third rotors. The controller may switch the first operation mode in which the power is circulated with the signs of the rotational directions of the first and second rotors being fixed to the second operation mode in which the power is not circulated, in other words, change an operating condition of the power transmission apparatus in which the power is circulated to an operating condition thereof in which the power is not circulated without reversing the first and second rotors.

The sign of the rotational energy represents whether the energy is outputted from or inputted to the rotor.

The power-driven member is coupled to the third rotor both in the first and second operation modes. In other words, the first and second rotors are coupled to the power source, so that the energy produced by the power source may be circulated between the first and second rotors in the first operation mode.

The first, second, and third rotors are so linked that rotational speeds thereof lie on a straight line in a nomographic chart.

One of the first and second connecting mechanisms works to connects two of the first, second, and third rotors together which lie in rotational speed thereof at both ends of the nomographic chart or two of the first, second, and third rotors together which lie in rotational speed thereof at one of the ends and intermediate between the ends.

One of the first and second connecting mechanism includes a speed variator. A first-order derivative value of a function in which an output-to-input speed ratio of the speed variator is expressed by an independent variable, and an output-to-input speed ratio of a power transmission path from the power source to the power-driven wheel is expressed by a dependent variable with respect to the independent variable in the first operation mode is opposite in sign to that in the second operation mode. Specifically, when the first operation mode has switched to the second operation mode, the output-to-input speed ratio that is the dependent variable may be changed in a direction opposite to that in the first operation mode by changing the output-to-input speed ratio of the speed variable in a direction opposite to that before the second operation mode is entered. This permits a range of the output-to-input speed ratio which may be regulated to be increased, which may permit the size of the speed variator to be reduced.

The power source may be coupled mechanically to the first rotor both in the first and second operation modes. The power-driven member may be coupled mechanically to the third rotor both in the first and second operation modes. Specifically, the power source is connected to the first rotor or the second rotor, thereby inducing the circulation of the power between the first rotor and the second rotor in the first operation mode to achieve the geared neutral.

The torque of the second rotor and the third rotor is proportional in magnitude to that of the first rotor. The power source may be coupled mechanically to the second rotor both in the first and second operation modes, while the power-driven member may be coupled mechanically to the third rotor both in the first and second operation modes. Specifically, the power source is connected to the first rotor or the second rotor, thereby inducing the circulation of the power between the first rotor and the second rotor in the first operation mode to achieve the geared neutral. Further, when no load is exerted on the first rotor (i.e., the torque of the first rotor is zero) in the second operation mode, it will cause the torques of the second and third rotor to be zero (0), so that the second and third rotors are coupled directly to each other through the second connecting mechanism.

The second rotor may be coupled mechanically to a speed variator both in the first and second operation modes.

The first rotor may be coupled mechanically to a speed variator both in the first and second operation modes.

The third rotor may be coupled mechanically to a speed variator both in the first and second operation modes.

The controller works to switch between the first operation mode to the second operation mode. At least one of the first and second connecting mechanisms includes a second mode-switching speed variator which serves to change a rotational speed of at least one of the second and third rotors so as to compensate for a difference in speed between the second and third rotors when the first operation mode is switched to the second operation mode to establish the mechanical connection between the second and third rotors. Specifically, when the first operation mode is switched to the second operation mode, a difference in speed between the second rotor and the third rotor will be about zero (0), thereby avoiding the breakage of transmission of torque therebetween.

The second mode-switching speed variator may have a fixed output-to-input speed ratio. This permits the second mode-switching speed variator to be simplified in structure thereof.

At least one of the first and second connecting mechanisms includes a first mode-switching speed variator which serves to change a rotational speed of at least one of the first and second rotors so as to compensate for a difference in speed between the first and second rotors when the second operation mode is switched to the first operation mode to establish the mechanical connection between the first and second rotors. Specifically, when the second operation mode is switched to the first operation mode, a difference in speed between the first rotor and the second rotor will be about zero (0), thereby avoiding the breakage of transmission of torque therebetween.

The first mode-switching speed variator may have a fixed output-to-input speed ratio. This permits the second mode-switching speed variator to be simplified in structure thereof.

The power split mechanism may include a planetary gear set equipped with a sun gear, a carrier, and a ring gear which serve as the first, second, and third rotors.

The power split mechanism may include a first planetary gear set equipped with a sun gear, a carrier, and a ring gear and a second planetary gear set equipped with a sun gear, a carrier, and a ring gear. Two of the sun gear, the carrier, and the ring gear of the first planetary gear set are coupled mechanically to two of the sun gear, the carrier, and the ring gear of the second planetary gear set The sun gears the carriers and the ring gears of the first and second planetary gear sets are broken down into four groups which have rotation speeds different from each other in a nomographic chart, the three rotors of the power slit device belonging to three of the four groups.

The first, second, and third rotors of the power split mechanism may alternatively be implemented by a side gear, a pinion gear, and a ring gear of a differential gear.

The power source may be a main engine mounted in an automotive vehicle, while the power-driven member may be a driven wheel of the automotive vehicle.

The power source may be implemented by an electric rotating machine and an internal combustion engine. The first, second, and third rotors may be so linked that rotational speeds thereof are arrayed on a straight line in the nomographic chart. The power split mechanism may also includes a fourth rotor lying on the straight line in the nomographic chart. The power transmission apparatus may further comprise a first power transmission control mechanism which works to selectively establish and block transmission of the power from one of the first to fourth rotors which serves as a starting rotor to start the internal combustion engine to the internal combustion engine and a second power transmission control mechanism which works to selectively establish and block transmission of the power from the internal combustion engine to one of the first to fourth rotors which serves as a power transmission rotor and is other than the starting rotor. Specifically, the starting rotor may apply the torque to the rotating shaft of the internal combustion engine, while the torque of the engine may be applied to the power transmission rotor. In other words, the internal combustion engine may be started using the torque of the starting rotor, thereby eliminating the need for a separate engine starter. The transmission of power among the starting rotor, the power transmission rotor, and the internal combustion engine may be established or blocked selectively, thereby avoiding an unwanted consumption of energy arising from application of torque to the rotating shaft of the internal combustion engine when it is at rest and also enabling the transmission of power among the rotating shaft of the internal combustion engine, the starting rotor, and the power transmission rotor to be established or blocked based on a difference in speed therebetween.

The first power transmission control mechanism may include an electronically controlled breaker which works to break transmission of the power between the starting rotor and the rotating shaft of the internal combustion engine. This avoids the transmission of power from the starting rotor to the rotating shaft of the internal combustion engine before it is required to start the internal combustion engine, thus minimizing an unwanted consumption of energy arising from application of torque to the rotating shaft of the internal combustion engine before it is required to start the internal combustion engine.

The first power transmission control mechanism may also include a one-way transmission mechanism which transmits the power to the internal combustion engine under the condition that a rotational speed of the starting rotor relative to that of the rotating shaft of the internal combustion engine is not negative. When fuel is burned in a combustion chamber of the internal combustion engine, so that the torque is produced, it will result in a rapid elevation in speed of the rotating shaft of the engine. When such a variation in rotation of the rotating shaft of the engine, it may cause the pulsation of torque to occur the power transmission apparatus. The one-way transmission mechanism works to block the transmission of power from the rotating shaft of the internal combustion engine to the starting rotor when the speed of the rotating shaft of the internal combustion engine has increased and exceeded that of the starting rotor, thus avoiding the transmission of power from the engine to the starting rotor.

The second power transmission control mechanism may include a one-way transmission mechanism which transmits the power from the internal combustion engine under the condition that a rotational speed of the rotating shaft of the internal combustion engine relative to that of the power transmission rotor is not negative. When it is required to connect the rotating shaft of the internal combustion engine mechanically to the power transmission rotor to apply the torque of the internal combustion engine to the power transmission rotor, it may be achieved smoothly by bringing the speed of the rotating shaft into agreement with that of the power transmission rotor and then connecting them mechanically. This, however, requires fine control. The power transmission apparatus of this invention, therefore, has the one-way transmission mechanism to start the transmission of power outputted by the engine to the power transmission rotor in a simple manner at the time when the speed of the rotating shaft of the engine is brought into agreement with that of the power transmission rotor.

An absolute value of the rotational speed of the starting rotor is smaller than or equal to that of the rotational speed of the power transmission rotor. It is easy to decrease the speed of the starting rotor, which enables a difference in speed between the starting rotor and the rotating shaft of the engine to be decreased when the engine is started.

According to the second aspect of the invention, there is provided a power transmission system for a vehicle which comprises the above described power transmission apparatus, and a load torque applying mechanism which works to control an operation of the first power transmission mechanism to apply a load torque of the internal combustion engine to the starting rotor when it is required to brake the vehicle. This compensates for a lack in load torque, as produced by a regenerative operation of an electric rotating machine, for producing a braking force.

The power transmission system is preferably designed so that a total output-to-input speed ratio of a power transmission path extending from an input that is the electric rotating machine to an output that is the driven wheel can be regulated to a sufficiently low speed value. This is because the electric rotating machine is permitted to be reduced in size, thus resulting in lack in load torque, as produced by the regenerative operation of the electric rotating machine. The above design may be achieved by connecting the electric rotating machine mechanically to two of the four rotors which are not joined mechanically to the driven wheel in the first operation mode and establishing the connection to one of the two through a speed variator.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 22(a) to FIGS. 22(j) are nomographic charts which represent modified structures of a power split device of the invention;

DESCRIPTION OF THE PREFERRED EMBODIMENTS

Figure 1:
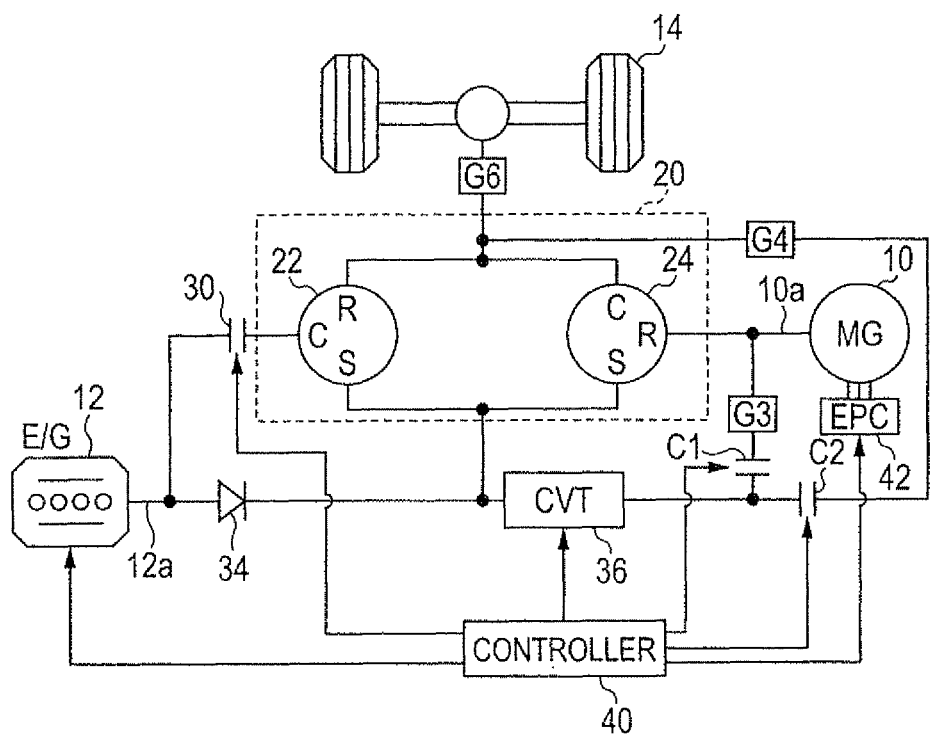
FIG. 1 is a block diagram which illustrates a power transmission device installed in a hybrid system for a vehicle according to the first embodiment of the invention.

Referring to the drawings, wherein like reference numbers refer to like parts in several views, particularly to FIG. 1, there is shown a power transmission device according to the first embodiment of the invention which is installed in a hybrid system. The hybrid system may be used in the so-called hybrid vehicles.

The hybrid system includes a motor-generator 10 and a power split device 20. The motor-generator 10 is made of a three-phase ac motor-generator and works as a power producing device or main engine along with an internal combustion engine 12. The power split device 20 works to split power or torque to be outputted among power split rotors disposed therein, in other words, the motor-generator 10, the internal combustion engine (e.g., a gasoline engine) 12, and driven wheels 14 of an automotive vehicle.

The power split device 20 includes a first planetary gear set 22 and a second planetary gear set 24. The first planetary gear set 22 has a ring gear R joined mechanically to a carrier C of the second planetary gear set 24 and also has a sun gear S joined mechanically to a sun gear S of the second planetary gear set 24. To the ring gear R of the second planetary gear set 24, an output axis 10a (i.e. a rotating shaft) of the motor-generator 10 is coupled mechanically. The driven wheels 14 of the vehicle are joined mechanically to the ring gear R of the first planetary gear set 22 and the carrier C of the second planetary gear set 24. Specifically, the ring gear R of the first planetary gear set 22 and the carrier C of the second planetary gear set 24 are coupled mechanically to the driven wheels 14 through a typical differential gear, a typical drive shaft, and a gear G6. Note that rotors (which will also be called power split rotors below) of the power split device 20, as referred to herein, are not limited to the sun gears S, the carriers C, and the ring gears R of the first and second planetary gear sets 22 and 24, but may additionally or only include rotating parts of the differential gear and/or the drive shaft.

The carrier C of the first planetary gear set 22 is connected mechanically to a crankshaft (i.e., a rotating shaft 12a) of the internal combustion engine 12 through a clutch 30. The clutch 30 works as an electronically controlled mechanical breaker to break or block the transmission of power (torque) between the carrier C of the first planetary gear set 22 and the rotating shaft 12a. In this embodiment, the clutch 30 is of a normally open type.

A one-way bearing 34 is disposed between the sun gears S of the first planetary gear set 22 and the second planetary gear set 24 and the rotating shaft 12a of the engine 12. The one-way bearing 34 works as a one-way transmission control mechanism to permit the transmission of power (torque) from the engine 12 to the sun gears S of the first and second planetary gear sets 22 and 24 under the condition that the rotational speed of the rotating shaft 12a is not lower than that of the sun gears S of the first and second planetary gear sets 22 and 24. In other words, the one-way bearing 34 works to have the sun gears S follow the rotation of the rotating shaft 12a of the engine 12 unless the speed of the sun gear S is greater than that of the rotating shaft 12a.

The sun gears S of the first and second planetary gear sets 22 and 24 are coupled mechanically to the rotating shaft 10a of the motor-generator 10 through a continuously variable transmission (CVT) 36, a clutch C1, and a gear G3. In other words, the sun gears S of the first and second planetary gear sets 22 and 24 are so linked as to receive the torque from the motor-generator 10 without any rotating parts or rotors (i.e., the power split rotors) of the power split device 20 which engage the sun gears S. The gear G3 serves as a counter gear to orient the speed of the sun gears S of the first and second planetary gear sets 22 and 24 and the speed of the ring gear R of the second planetary gear set 24 to have signs (i.e., directions) different from each other. The number of teeth of the gear G3 may be either identical with or different from that of the ring gear R of the second planetary gear set 24. The CVT 36, as used in this embodiment, is of a mechanical type using a metallic or rubber belt. The clutch C1 functions as an electronically controlled hydraulic breaker to block or open the transmission of power between the CVT 36 and the ring gear R of the second planetary gear set 24.

The sun gears S of the first and second planetary gear sets 22 and 24 are also joined mechanically to the ring gear R of the first planetary gear set 22 and the carrier C of the second planetary gear set 24 through the CVT 36, a clutch C2 and a gear G4. The clutch C2 works as an electronically controlled hydraulic breaker to block the transmission of power between a set of the ring gear R of the first planetary gear set 22 and the carrier C of the second planetary gear set 24 and the CVT 36.

The hybrid system also includes a controller 40 to control an operation of the power transmission device. Specifically, the controller 40 works to actuate the clutches 30, C1, and C2 to control the operation of the power transmission device and determine a controlled variable for the engine 12. The controller 40 also works to control an operation of an electric power converter circuit 42 to determine a controlled variable for the motor-generator 10.

Figure 2:
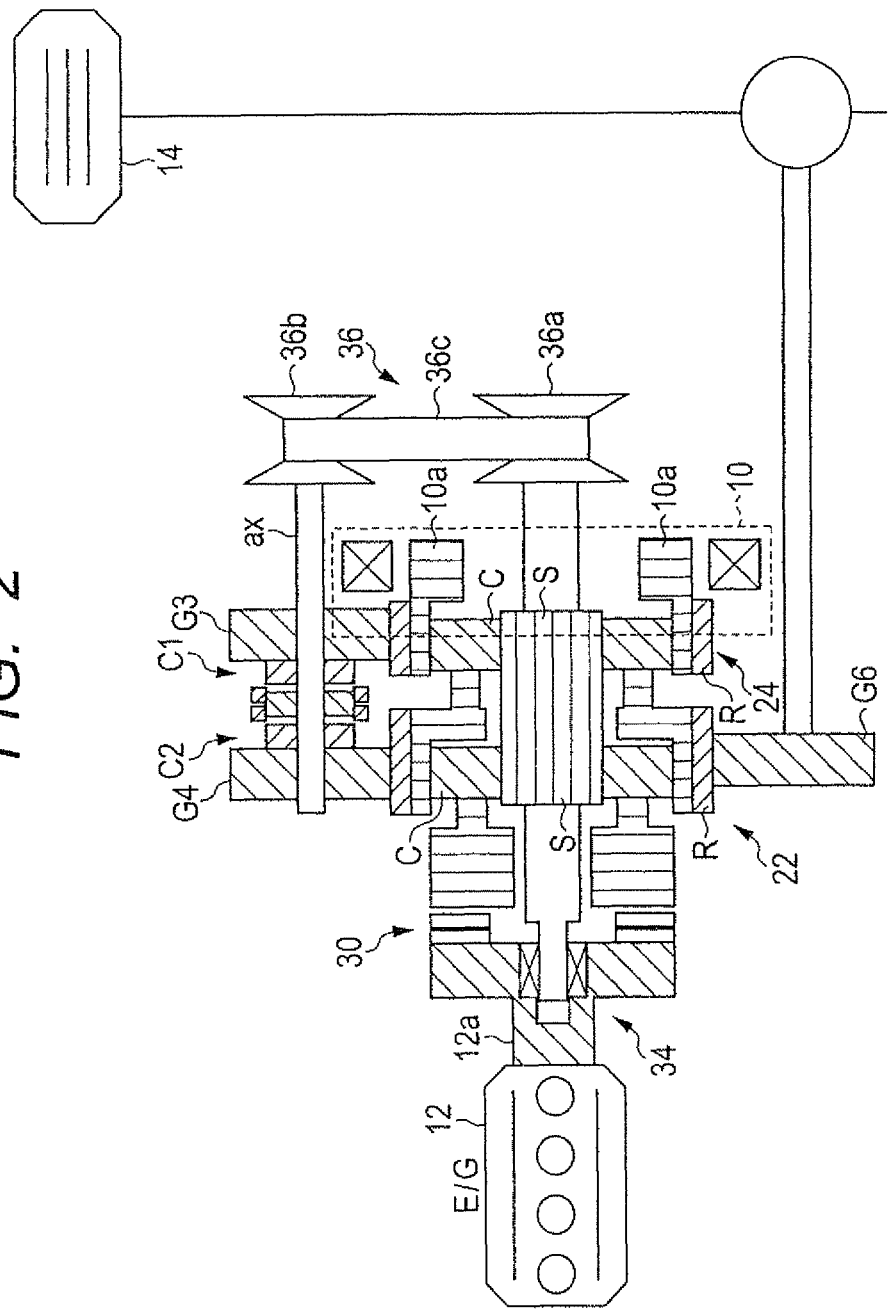
FIG. 2 is a sectional view which illustrates an internal structure of the power transmission device of FIG. 1.

FIG. 2 is a sectional view which illustrates a mechanical structure of the power transmission device.

The first and second planetary gear sets 22 and 24 have the sun gears S which are disposed coaxially and joined mechanically to each other. The sun gears S are also coupled to a rotating shaft ax through a pulley 36a, a belt 36c, and a pulley 36b of the CVT 36. To the rotating shaft ax, the clutches C1 and C2 are joined directly to establish or block the mechanical connection between the rotating shaft ax and the gear G3 and between the rotating shaft ax and the gear G4. The direct joint of the clutches C1 and C2 to the rotating shaft ax facilitates ease of reducing the size of the clutches C1 and C2 and the power transmission device. This is because hydraulic lines through which working fluid is circulated are permitted to be disposed close to each other.

The power transmission device is so designed as to operate selectively either in a first operation mode or a second operation mode. In the first operation mode, the clutch C1 is in an engaged state, while the clutch C2 is in a disengaged state. In the second operation mode, the clutch C1 is in the disengaged state, while the clutch C2 is in the engaged state. The operations of the power transmission device in the first and second operation modes and a sequence of running states of the vehicle when the first operation mode is switched to the second operation mode will be described below, respectively.

First Operation Mode

Figure 3A:
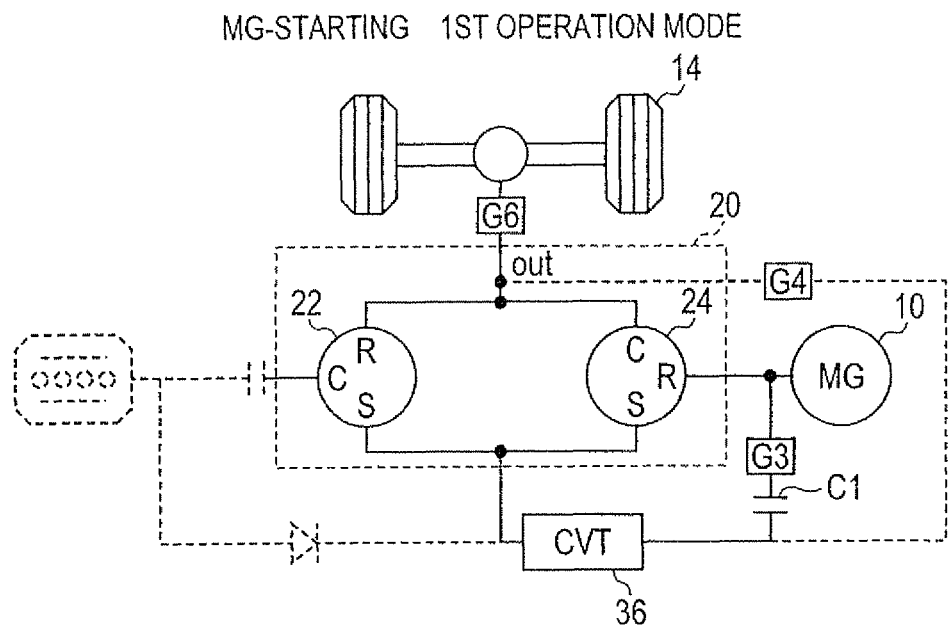
FIG. 3(a) is a schematic block diagram which shows a power transmission path when a vehicle is started by a motor-generator.
Figure 3B:
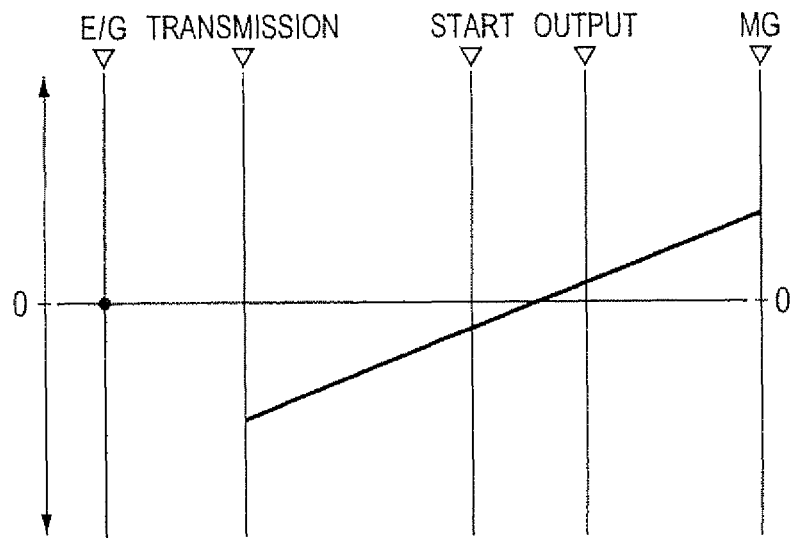
FIG. 3(b) is a nomographic chart which represents an operation of a power split device of the power transmission device of FIG. 1 along with the speed of an internal combustion engine.

The first operation mode is a starting mode in which a vehicle starting operation is made by the motor-generator 10. The first operation mode will be described below with reference to FIGS. 3(a) and 3(b). FIG. 3(a) illustrates a power transmission path when the vehicle is started. FIG. 3(b) is a nomographic chart which represents the operation of the power split device 20 along with the speed of the internal combustion engine 12. In the illustrated case, the clutch 30 is disengaged to block the connection between the internal combustion engine 12 and the carrier C of the first planetary gear set 22.

In the example of 3(a) and 3(b), the internal combustion engine 12 is at a stop. The speeds of the rotors of the first and second planetary gear sets 22 and 24 which constitute the power split device 20 are dependent on the speed of the motor-generator 10 and the gear ratio (also called an output-to-input speed ratio, a variable speed ratio, a pulley ratio, or a CVT ratio) of the CVT 36. Specifically, in the nomographic chart of FIG. 2(b), the speed of the sun gears S of the first and second planetary gear sets 22 and 24 (i.e., the speed of a power transmission rotor in FIG. 2(b)), the speed of the carrier C of the first planetary gear set 22 (i.e., the speed of a starting rotor in FIG. 2(b)), the speed of the ring gear R of the first planetary gear set 22 and the carrier C of the second planetary gear set 24 (i.e., the speed of output in FIG. 2(b)), and the ring gear R of the second planetary gear set 24 (i.e., the speed of the MG 10) lie on a diagonal straight line. The speeds of the rotors of the power split device 20 other than the sun gears S of the first and second planetary gear sets 22 and 24 and the ring gear R of the second planetary gear set 24 are, therefore, set by determining the speeds of the sun gears S and the ring gear R of the second planetary gear set 24. The sun gears S, the carriers C, and the ring gears R of the first and second planetary gear sets 22 and 24 rotate in conjunction with each other. For instance, the speed of only the carriers C may be zero (0) depending upon the speeds of the sun gears S and the ring gears R.

The structure of the power transmission device of this embodiment is designed to enable the motor-generator 10 to produce a higher degree of torque when starting the vehicle without need for increasing the size of the motor-generator 10. This is for the following reasons.

If, in the second planetary gear set 24, a ratio of the number Zs of teeth of the sun gear S to the number Zr of teeth of the ring gear R (i.e., Zs/Zr) is defined as ρ, a ratio of the speed Nm of the motor-generator 10 to the speed Ns of the sun gear S (i.e., Nm/Ns) is defined as β, and torques of the ring gear R, the sun gear S, the carrier C, and the motor-generator 10 are defined as Tr, Ts, Tc, and Tm, respectively, equations, as listed below, are met.

$$Tr = -Tc/(1+\rho) \quad (c1)$$

$$Ts = -\rho Tc/(1+\rho) \quad (c2)$$

$$\beta(Tm+Tr) = Ts \quad (c3)$$

Eliminating torques Tr and Ts from Eq. (c3) using Eqs. (c1) and (c2), we obtain $$Tc = (1+\rho)Tm/\{(\rho/\beta)-1\} \quad (c4)$$

Eq. (c4) shows that a great increase in torque Tc of the carrier C of the second planetary gear set 24 (i.e., the output axis of the power split device 20), in other words, the torque to be transmitted to the driven wheels 14 is achieved by approximating the ratios ρ and β to each other. This ensures the torque required to start the vehicle without need for increasing the size of the motor-generator 10.

The starting control of the engine 12 will be described below.

Figure 4A:
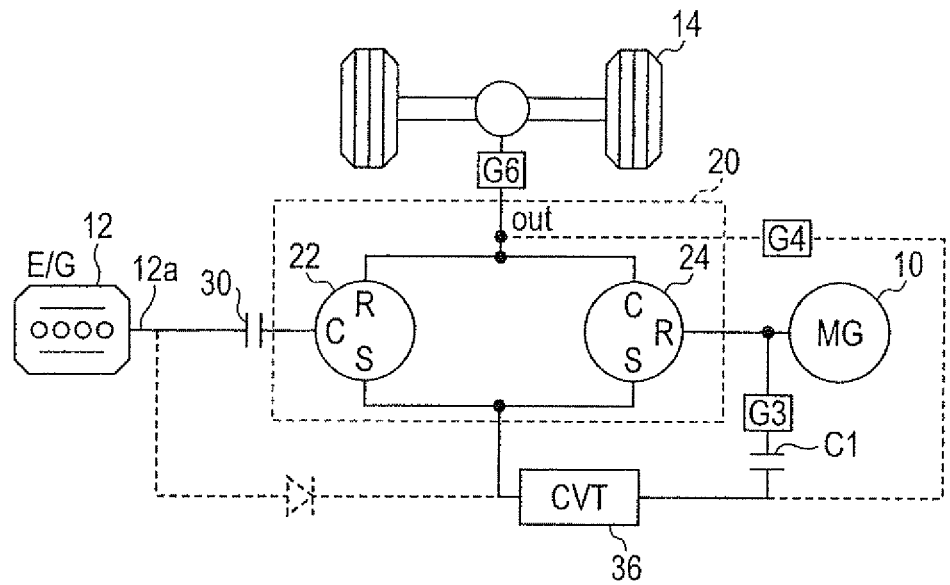
FIG. 4(a) is a schematic block diagram which shows a power transmission path when an internal combustion engine is started by a power split device of FIG. 1.
Figure 4B:
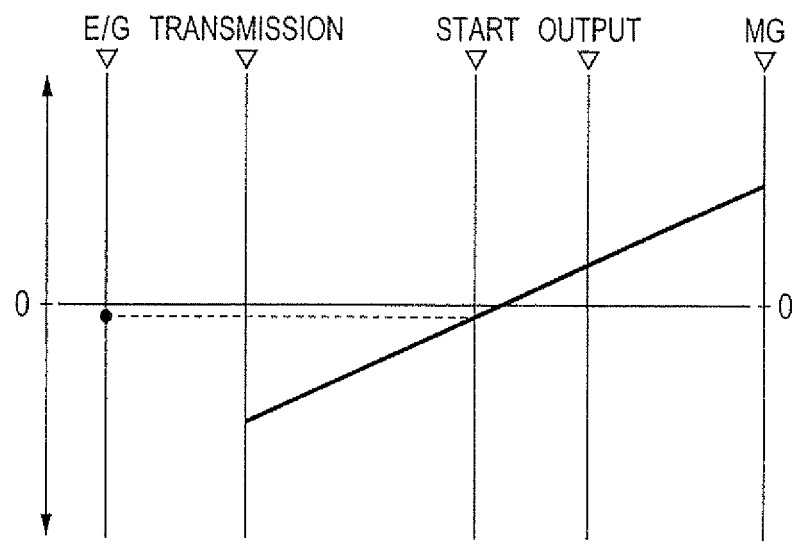
FIG. 4(b) is a nomographic chart which represents an operation of a power split device along with the speed of an internal combustion engine.

FIGS. 4(a) and 4(b) show an operation of the power transmission device to start the engine 12. FIG. 4(a) illustrates a power transmission path when the engine 12 is started. FIG. 4(b) is a nomographic chart which represents the operation of the power split device 20 along with the speed of the engine 12.

When it is required to start the engine 12, the controller 40 engages the clutch 30 to transmit the torque from the carrier C of the first planetary gear set 22 (i.e., the torque from the starting rotor) to the rotating shaft 12a of the engine 12 through the clutch 30, thereby achieving initial rotation of the rotating shaft 12a of the engine 12. The rotating shaft 12a of the engine 12 is driven or rotated by the rotation of the carrier C of the first planetary gear set 22. When the speed of the rotating shaft 12a of the engine 12 is increased to a given value, the controller 40 starts to control the burning of fuel in the engine 12. At an initial stage when the fuel has started to be burned after the engine 12 is cranked, the torque on the rotating shaft 12a rises rapidly, so that the speed thereof increases quickly. The transmission of pulsation of the torque arising from the initial burning of the fuel in the engine 12 to the power split device 20 may be eliminated by selecting the gear ratio of the CVT 36 so as to greatly increase a total gear ratio (i.e., an output-to-input speed ratio) of a power transmission path extending the engine 12 (i.e., a torque input) to the driven wheels 14 (i.e., a torque output). When the starting of the engine 12 is completed, the controller 40 disengages the clutch 30.

Figure 5A:
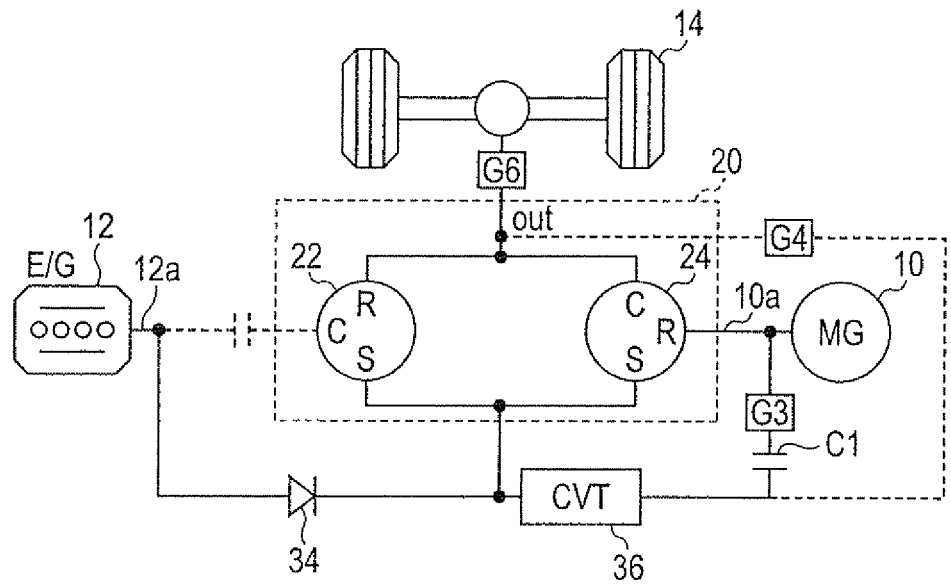
FIG. 5(a) is a schematic block diagram which shows a power transmission path through which engine torque is transmitted when the power transmission device of FIG. 1 is in a first operation mode.
Figure 5B:
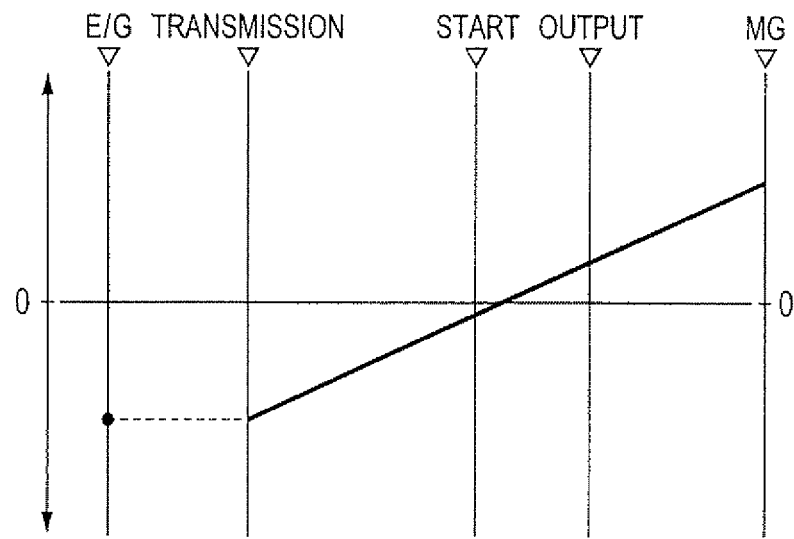
FIG. 5(b) is a nomographic chart which represents an operation of a power split device along with the speed of an internal combustion engine in the first operation mode, as illustrated in FIG. 5(a)

FIGS. 5(a) and 5(b) show an operation of the power transmission device after the engine 12 is started up. FIG. 5(a) illustrates a power transmission path through which the torque, as outputted from the engine 12 is transmitted. FIG. 5(b) is a nomographic chart which represents the operation of the power split device 20 along with the speed of the engine 12. The clutch 30 is disengaged to block the connection between the engine 12 and the carrier C of the first planetary gear set 22.

After the engine 12 is started up, the speed of the rotating shaft 12a of the engine 12 reaches the speed of the sun gears S of the first and second planetary gear sets 22 and 24 (i.e., the speed of the power transmission rotor), thereby giving the torque of the engine 12 to the power split device 20. After the torque is provided from the engine 12 to the power split device 20, the controller 40 may operate the motor-generator 10 as an electric generator or turn off the power converter circuit 42 to place the motor-generator 10 in a no-load operation.

As apparent from the above discussion, the power transmission device of this embodiment is capable of starting the internal combustion engine 12 during running of the vehicle powered by the motor-generator 10, in other words, during the operation of the motor-generator 10 without use of a typical engine starter equipped with an electric motor. The rotor used to start the engine 12 (i.e., the carrier C of the first planetary gear set 22) and the rotors to which the torque of the engine 12 is given (i.e., the sun gears S of the first and second planetary gear sets 22 and 24) are designed to be separate, in other words, disposed independently from each other, thereby enabling the speed of the rotors to which the torque is provided from the engine 12 to be elevated quickly after the starting of the engine 12. This results in an increase in time the engine 12 is run in an effective operation range.

Second Operation Mode

Figure 6A:
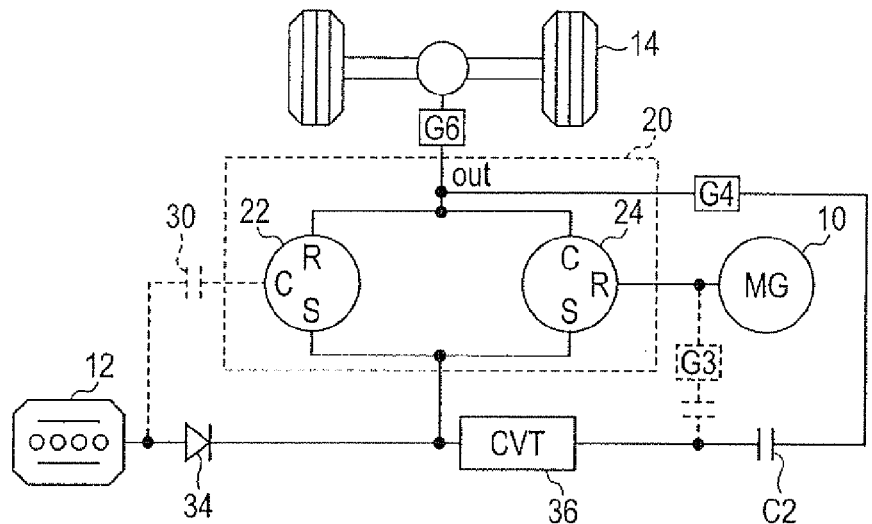
FIG. 6(a) is a schematic block diagram which shows a power transmission path through which engine torque is transmitted when the power transmission device of FIG. 1 is in a second operation mode, i.e., a high-speed range.
Figure 6B:
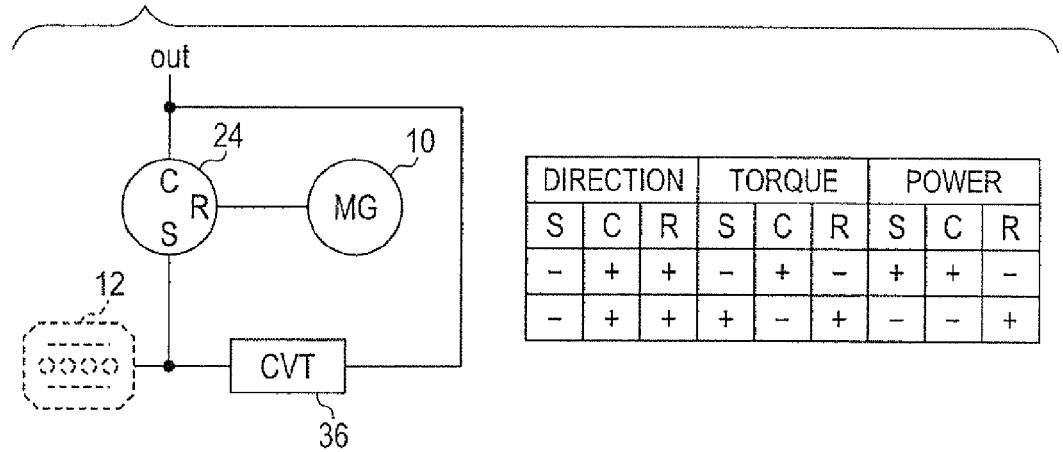
FIG. 6(b) is a partially schematic block diagram which illustrates the case where a positive or a negative torque is outputted only from a motor-generator.
Figure 6C:
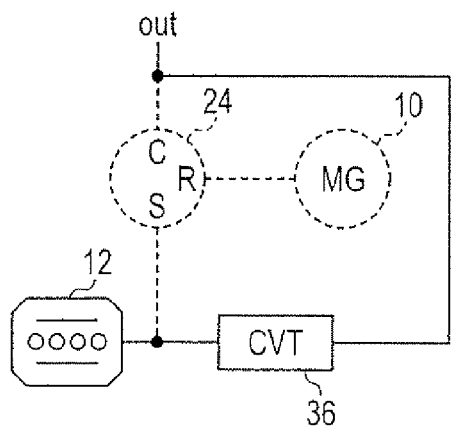
FIG. 6(c) is a partially schematic block diagram which illustrates the case where a positive or a negative torque is outputted only from an internal combustion engine.

FIG. 6(a) illustrates a power transmission path of the power transmission device in the second operation mode. The sun gears S of the first and second planetary gear sets 22 and 24 are connected mechanically to the ring gear R of the first planetary gear set 22 and the carrier C of the second planetary gear set 24. FIG. 6(b) illustrates the case where a positive or a negative torque is outputted only from the motor-generator 10. FIG. 6(c) illustrates the case where a positive or a negative torque is outputted only from the engine 12. The first planetary gear set 22 does not contribute to transmission of the torque and thus is omitted from FIGS. 6(b) and 6(c). Specifically, as apparent from the above Eqs. (c1) and (c2), when the torque Tc of the carrier C is zero (0), it will cause the torque Ts of the sun gear S and the torque Tr of the ring gear R to be zero (0), so that the first planetary gear set 22 does not contribute to the transmission of torque.

The operation mode in FIG. 6(b) is higher in energy efficiency than the first operation mode. This is because that the power split device 20 is so designed that amounts of output rotational energy (i.e., power) of the carrier C of the second planetary gear set 24 and the sun gear S of the second planetary gear set 24 are opposite in sign to each other in the first operation mode, while they are identical in sign with each other (i.e., minus (−) sign) in the operation mode of FIG. 6(b). Specifically, when two of the power split rotors of the power split device 20 are connected mechanically to each other through a mechanical path extending outside the power split device 20, and the two rotors are different in sign of the output rotational energy from each other, the energy or power is circulated from one of the two rotors to the other rotor, thus resulting in a decrease in energy efficiency. In contrast, in the example of FIG. 6(b), the power of the carrier C of the second planetary gear set 24 and the power of the sun gear S of the second planetary gear set 24 which are coupled to each other through a mechanical path extending outside the power split device 20 through the CVT 36 are identical in sign with each other, thus resulting in an increase in energy efficiency as compared with the first operation mode. This mode in which the power inputted from one of the three rotors of each of the planetary gear sets 22 and 24 is split completely between the two remaining rotors will also be referred to as a power split mode below.

Note that in a table on the right side of FIG. 6(b), the plus (+) and minus (−) signs of the rotational direction of each of the sun gear S, the carrier C, and the ring gear R represent opposite directions: a normal direction and a reverse direction thereof, the plus (+) sign of the rotational energy (i.e., power) indicates when the rotational energy is being outputted from the power split device 20, and the plus (+) and minus (−) signs of the torque are so defined as to meet the condition that the product of signs of the rotational direction and the torque will be the sign of the rotational energy (i.e., power). The circulation of the power is dependent only on whether the powers of the rotors of the power split device 20 are identical in sign with each other or not. Table of FIG. 6(b) is derived based on the fact that the torques of the ring gear R and the carrier C are different in sign, and the torques of the sun gear S and the carrier C are also different in sign (see Eqs. (c1) and (c2)), and which of the rotational directions of the sun gear S, the carrier C, and the ring gear R are identical in sign with each other (see the nomographic chart of FIG. 5(b)).

The operation mode in FIG. 6(c) is also higher in energy efficiency than the first operation mode. This is because that the torque outputted by the engine 12 is transmitted directly to the driven wheels 14 (as denoted by "out" in FIG. 6(c)) through the CVT 36, so that the energy is not outputted to the driven wheels 14 through the power split device 20. This operation mode is achieved by setting the torque Tr of the ring gear R to zero (0) to bring the torque Ts of the sun gear S and the torque Tc of the carrier Tc to zero (0) (see Eqs. (c1) and (c2)).

When it is required to start the internal combustion engine 12 in the second operation mode, the controller 40 engages the clutch 30 to connect the carrier C of the first planetary gear set 22 to the rotating shaft 12a of the engine 12. In this mode, the power split device 20 is so linked that when the signs of rotational directions of the sun gear S and the carrier C of the second planetary gear set 24 are set to one, of the positive and negative values, the rotational energy or power to be outputted from the carrier C of the first planetary gear set 22 and that to be outputted from the carrier C of the second planetary gear set 24 are identical in sign with each other or zero (0). In the first operation mode, the signs of rotational energy of the sun gear S and the carrier C of the second planetary gear set 24 are, as described above, opposite to each other.

The reason why the first operation mode which is lower in energy efficiency is used to start the engine 12 is because the first operation mode may achieve the so-called geared neutral which places the speed of the driven wheels 14 at zero (0) during running of the motor-generator 10 or the engine 12 and also increase the torque output. The geared neutral is established in the first operation mode because the first operation mode creates the circulation of the power between the rotors of the power split device 20 which is the factor contributing to the decrease in energy efficiency. Specifically, when the power split device 20 is in the geared neutral, the amount of rotational energy (i.e., power) outputted to the driven wheels 14 will be zero (0). If the power is not circulated through a looped mechanical path extending through the motor-generator 10, the engine 12, and the power split device 20, it will cause the output energy of the motor-generator 10 or the engine 12 to be consumed fully as thermal energy in the power split device 20 according to the energy conservation law. This will result in impractical structure of the power split device 20 which does not work to split the power, in other words, in which the rotors do not function as power split rotors of the power split device 20. Consequently, the circulation of the power is essential to achieve the geared neutral unless there is another path through which the energy is outputted from the power split device 20 other than the looped mechanical path.

Switching from First Operation Mode to Second Operation Mode

Figures 7A, 7B:
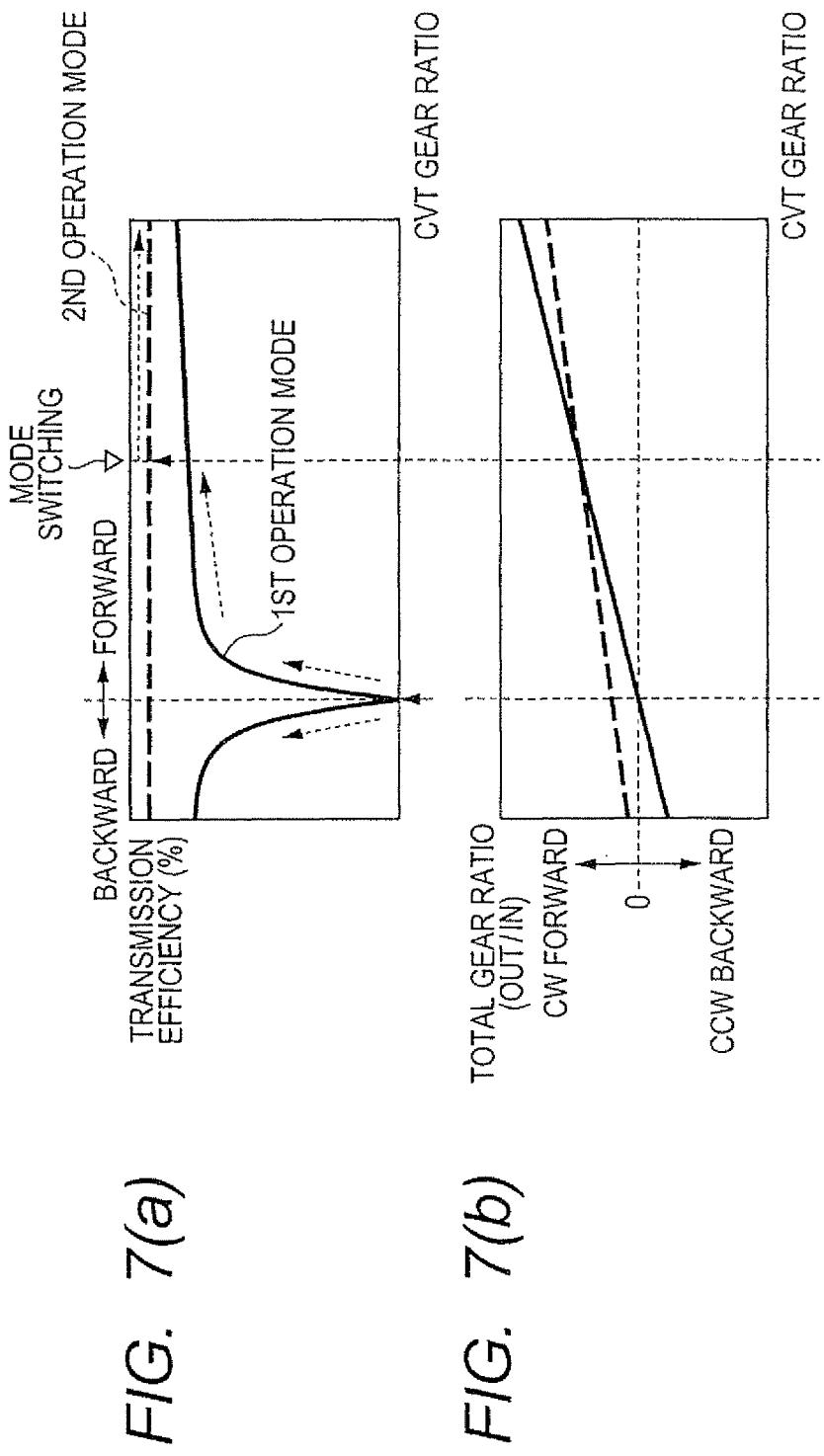
FIG. 7(a) is a graph which represents the efficiency of transmission of power in the power transmission device of FIG. 1 when a first operation mode is switched to a second operation mode.
FIG. 7(b) is a graph which represents a total output-to-input speed ratio in the power transmission device of FIG. 1 when a first operation mode is switched to a second operation mode.

FIGS. 7(a) and 7(b) demonstrate the switching from the first operation mode to the second operation mode when the output of the engine 12 is inputted to the driven wheels 14. When the first operation mode is entered, the controller 40 may change the gear ratio of the CVT 36 continuously to change the direction in which the vehicle travels from the backward (i.e., a counter clockwise direction) to the forward direction (i.e., a clockwise direction). When a given gear ratio of the CVT 36 is reached, the operation mode of the power transmission device is switched to the second operation mode, thereby improving the efficiency of the transmission of power as compared with when the gear ratio of the CVT 36 is changed in the first operation mode.

The controller 40 performs the first-to-second operation mode switching under the condition that a total gear ratio (i.e., a total output-to-input speed ratio) of the power transmission device that is a ratio of the speed of the generator-motor 10 or the internal combustion engine 12 (i.e., an input speed of rotation inputted to the power transmission device) to the speed of the driven wheels 14 (i.e., an output speed of rotation outputted from the power transmission device) is constant. Additionally, the controller 40 makes the first-to-second operation mode switching when the speed of some of the power split rotors of the power split device 20 connected together by the clutch C1 is identical with that of some of the power split rotors to be connected together by the clutch C2, in other words, rotational speeds on an input side and an output side of the clutch C2 is identical with each other. This permits the clutches C1 and C2 to be engaged simultaneously at the instant when the first operation mode is switched to the second operation mode, thereby avoiding omission of transmission of torque to the driven wheels 14. It is not always necessary to place the clutches C1 and C2 in the engaged state instantaneously when the first operation mode is switched to the second operation mode. The clutch C2 may be engaged after the lapse of a given period of time from when or just after the clutch C1 is disengaged as long as such a time lag is within a range acceptable for running the vehicle, in other words, a little omission of transmission of torque is acceptable to the running of the vehicle.

The omission of transmission of torque is eliminated by the gears G3 and G4, as illustrated in FIG. 1. The speeds of the sun gear S, the carrier C, and the ring gear R of the second planetary gear set 24 are all identical with each other or all different from each other. The second planetary gear set 24 of this embodiment is so designed that the speed of the sun gear S is opposite in sign to that of the ring gear R in the nomographic chart. The speeds of the sun gear S, the carrier C, and the ring gear R are, therefore, always different from each other except when they are all zero (0). It is, thus, impossible for only the CVT 36 to realize the condition that the speed of some of the power split rotors to be connected together by the clutch C1 is identical with that of some of the power split rotors to be connected together by the clutch C2. Such realization requires at least one of the gear G3 disposed between the ring gear R of the second planetary gear set 24 and the clutch C1 and the gear G4 disposed between the carrier C of the second planetary gear set 24 and the clutch C2 to compensate for a difference in speed between the sun gear S and the ring gear R or between the sun gear S and the carrier C. The gear G3 is essential to work as a counter gear in this embodiment and thus capable of achieving the above compensation in itself, however, the power transmission device is designed to also have the gear G4. The gear ratios of the gears G3 and G4 and the CVT 36 required to eliminate the omission of transmission of torque are given by a section "ARRANGEMENT OF GEAR Gn", as will appear following the explanation of the seventh embodiment.

The structure of the hybrid system (i.e., the power transmission device) of this embodiment offers the following advantages.

1) The power transmission device is designed to switch between the first operation mode in which the power is circulated between the rotors of the power split device 20 and the second operation mode in which the circulation of the power is not created. This permits the geared neutral to be established using the circulation of power in the first operation mode and the energy efficiency to be improved using the second operation mode in a high-speed range.
2) The clutches C1 and C2 are coupled directly to the rotating shaft ax of the power transmission device, thus facilitating the ease of arranging the clutches C1 and C2 close to each other, which permits the size of the power transmission device to be reduced.
3) The clutches C1 and C2 are designed to be engaged independently from each other, thus facilitating the ease of avoiding the emission of transmission of torque to the driven wheels 14.
4) In the first operation mode, the power transmission device establishes the connection of the driven wheels 14 to ones of the power split rotors of the power split device 20 other than ones disposed in the looped mechanical path through which the power is circulated, thereby enabling the useful geared neutral to be established.
5) The power transmission device has a mechanical measure (i.e., the gears G3 and G4) to compensate for a difference in speed between the sun gear S and the ring gear R or between the sun gear S and the carrier C, thereby eliminating the instantaneous omission of transmission of torque to the driven wheels 14 upon the switching from the first operation mode to the second operation mode.
6) The power transmission device is equipped with a first power transmission control mechanism (i.e., the clutch 30) which establishes or blocks the transmission of torque between the starting rotor of the power split device 20 (i.e., the carrier C of the first planetary gear set 22) and the rotating shaft 12a of the engine 12 and a second power transmission control mechanism (i.e., the one-way bearing 34) which establishes or blocks the transmission of torque between the power transmission rotors of the power split device 20 (i.e., the sun gears S of the first and second planetary gear sets 22 and 24) and the rotating shaft 12a of the engine 12, thereby ensuring the starting of the engine 12 during running of the vehicle powered by the motor-generator 10 and also bringing the speed of the engine 12 to an effective operation range quickly after the engine 12 is started up.
7) The first power transmission control mechanism is, as described above, implemented by the electronically-controlled clutch 30 to establish or block the transmission of torque between the starting rotor of the power split device 20 (i.e., the carrier C of the first planetary gear set 22) and the rotating shaft 12a of the engine 12, thereby avoiding an error in transmission of torque from the starting rotor to the engine 12 before the engine 12 is started, which minimizes consumption of energy or power in the power transmission device.
8) The second power transmission control mechanism is, as described above, implemented by the one-way bearing 34 which establishes the transmission of torque from the rotating shaft 12a of the engine 12 to the power transmission rotors of the power split device 20 (i.e., the sun gears S of the first and second planetary gear sets 22 and 24) under the condition that the speed of the rotating shaft 12a of the engine 12 is not lower than that of the power transmission rotors. In other words, the torque outputted by the engine 12 is transmitted to the sun gears S automatically when the speed of the rotating shaft 12a of the engine 12 is brought into agreement with that of the sun gears S. Additionally, when the engine 12 is running, but it is not necessary to use the torque of the engine 12, the controller 40 may bring the speed of the engine 12 below that of the sun gears S of the first and second planetary gear sets 22 and 24 to run the engine 12 in an unloaded condition.
9) The power split device 20 is so designed that the speed of the carrier C of the first planetary gear set 22 which is used to apply an initial torque to the engine 12 will be as smaller than that of the sun gears S of the first and second planetary gear sets 22 and 24 to which the torque is transmitted from the engine 12 as possible, thereby enabling the engine 12 to run in the effective operation range quickly immediately after the engine 12 is started up.
10) Two of the rotors (i.e., the rotors of the second planetary gear set 24 in this embodiment) which are to have the right and left ends of the speeds in the nomographic chart are joined mechanically to the motor-generator 10, thereby enabling the motor-generator 10 to be run in the effective operation range for a prolonged time.
11) Of the two of the rotors of the second planetary gear set 24, as described above, which are to have the rightmost and leftmost ones of the speeds in the nomographic chart, respectively, one is joined mechanically to the motor-generator 10 through the CVT 36, thereby enabling the two of the rotors to be controlled in speed independently from each other like the case where two motor-generators are used in connection with the two of the rotors, respectively. In the case of use of such two motor-generators, this structure may also eliminate the loss of electric energy, as produced by one of the motor-generators which is operating as a generator, when the electric energy is supplied to the other motor-generator operating as an electric motor.
12) Of the four rotor groups (i.e., (a) the sun gears S of the first and second planetary gear sets 22 and 24, (b) the carrier C of the first planetary gear set 22, (c) the ring gear R of the first planetary gear set 22 and the carrier C of the second planetary gear set 24, and (d) the ring gear R of the second planetary gear set 24) which are to have different speeds in the monographic chart, respectively, one (i.e., the ring gear R of the first planetary gear set 22 and the carrier C of the second planetary gear set 24) other than one used to add the initial torque to the engine 12 for starting it is joined mechanically to the driven wheels 14, thereby facilitating ease of rotating the driven wheels 14 in a normal or a reverse direction and stopping them. The speed of the rotor for use in giving the initial torque to the engine 12 may be set independently from that of the driven wheels 14.

13) The power split device 20 is so designed as to joint two of the three rotors of the first planetary gear set 22 mechanically to two of the three rotors of the second planetary gear set 24, respectively, thereby enabling the four groups of the power split device 20 to be arrayed in speed on the straight line in the nomographic chart, as illustrated in FIG. 3(*b*).

Figure 8:
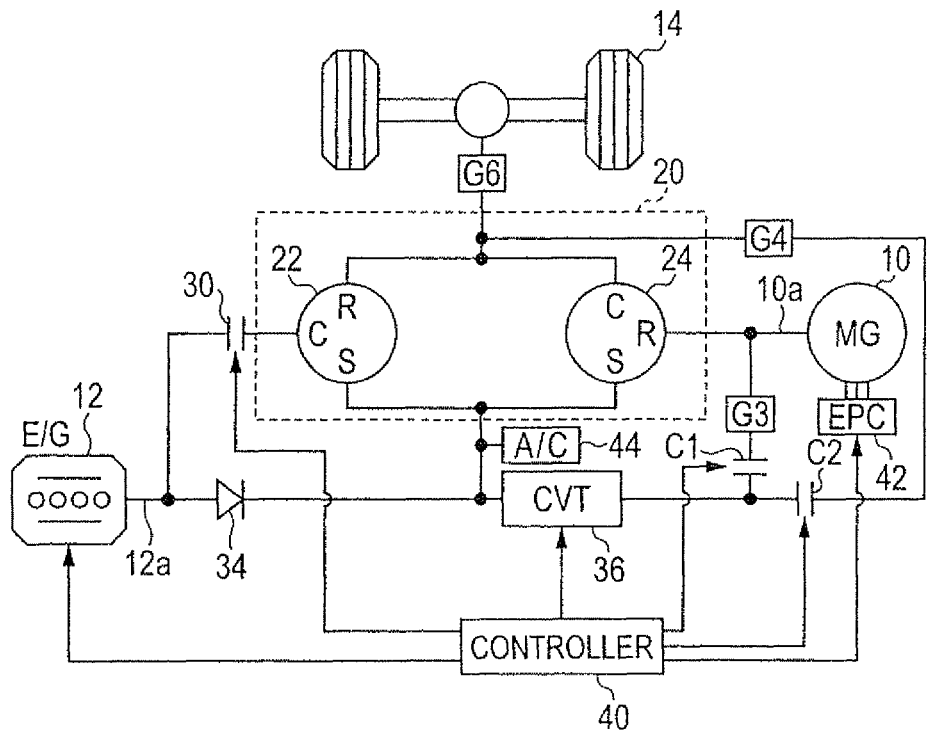
FIG. 8 is a block diagram which illustrates a power transmission device according to the second embodiment of the invention.

FIG. 8 illustrates the power transmission system according to the second embodiment of the invention. The same reference numbers as employed in FIG. 1 refer to the same parts, and explanation thereof in detail will be omitted here.

An conditioner 44 (i.e., an vehicle accessory) is installed in the hybrid vehicle and powered by the power split device 20. The air conditioner 44 is equipped with a compressor (not shown) which has a driven shaft connected mechanically to the sun gears S of the first and second planetary gear sets 22 and 24, so that the torque is supplied from the sun gears S to the compressor. The power transmission device is, as described above, capable of rotating the sun gears S of the first and second planetary gear sets 22 and 24 at speeds other than zero (0) when the driven wheels 14 are at rest and thus running the air conditioner 44 when the vehicle is parked.

The mechanical joint of the air conditioner 44 to the sun gears S of the first and second planetary gear sets 22 and 24 does not impinge on the above described circulation of power. The structure of the power transmission device of this embodiment, thus, has the same beneficial advantages produced by the first and second operation modes as those in the first embodiment.

The structure of the power transmission device of the second embodiment also have the following advantage in addition to the advantages (1) to (13), as described above.

(14) The power split device 20 is designed as a power source for the air conditioner 44, thus eliminating the need for an additional electric motor to run the air conditioner 44.

Figure 9:
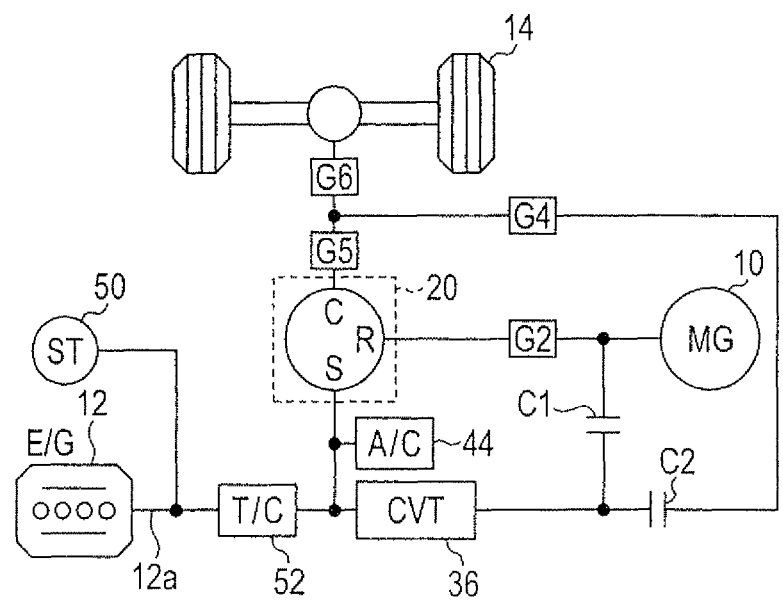
FIG. 9 is a block diagram which illustrates a power transmission device according to the third embodiment of the invention.

FIG. 9 illustrates the power transmission system according to the third embodiment of the invention. The same reference numbers as employed in FIG. 1 refer to the same parts, and explanation thereof in detail will be omitted here.

The power split device 20 is made by only a single planetary gear set. Mechanical joints of the power split device 20 (i.e., the planetary gear set) to the motor-generator 10, the engine 20, and the driven wheels 14 are the same as those of the second planetary gear set 24 in the first embodiment. The carrier C is, unlike the first embodiment, connected to the driven wheels 14 through the gears G5 and G6. The hybrid system is equipped with a starter motor 50 which is permanently connected to the rotating shaft 12*a* of the engine 12 to start the engine 12. The rotating shaft 12*a* of the engine 12 is also coupled mechanically to the sun gear S through a torque converter 52.

The structure of the power transmission device of this embodiment has the advantages (1) to (5), (10), and (11), as described above.

Figure 10:
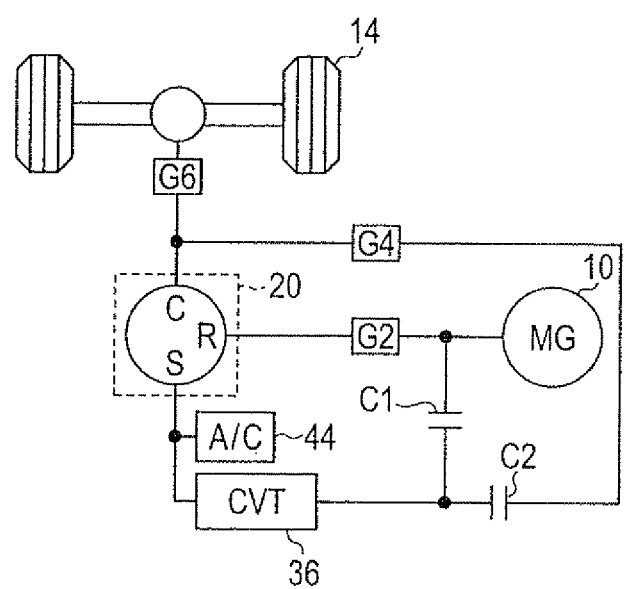
FIG. 10 is a block diagram which illustrates a power transmission device according to the fourth embodiment of the invention.

FIG. 10 illustrates the power transmission system according to the fourth embodiment of the invention. The same reference numbers as employed in FIG. 1 refer to the same parts, and explanation thereof in detail will be omitted here.

The power transmission system of this embodiment is installed in an electric vehicle equipped only with an electric rotating machine (i.e., the motor-generator 10) as a power source for the driven wheels 14.

The power split device 20 is, like in the third embodiment, made by only a single planetary gear set. Mechanical joints of the power split device 20 (i.e., the planetary gear set) to the motor-generator 10 and the driven wheels 14 are the same as those of the second planetary gear set 24 in the first embodiment. The planetary gear set is coupled to the motor-generator 10 through the gear G2. The clutch C1 is connected to a joint between the gear G2 and the motor-generator 10.

The installation of the power split device 20 in the electric vehicle offers the following advantages.

First, the power split device 20, as described in the first embodiment, serves to produce a great deal of torque to be applied to the driven wheels 14 when it is required to start the vehicle, thus permitting the motor-generator 10 to be reduced in size. This is because the lower limit of required output of the motor-generator 10 depends upon the torque outputted by the power split device 20 to the driven wheels 14 to start the vehicle. Secondly, the power transmission device of this embodiment also works to establish the geared neutral, thus enabling the part of the power split device 20 (i.e., the ring gear R and the sun gear S) to rotate when the driven wheels 14 are at rest, which is to be used as a power source for a vehicle-mounted accessory (i.e., the air conditioner 44 in this embodiment). Thirdly, the power transmission device may work to decrease the power to be supplied to the air conditioner 44 when the vehicle is in a transient state, for example, accelerating state wherein the consumption of energy is increased, thereby enabling the power to be increased which is required to be outputted from the power split device 20 to run the driven wheels 14. This eliminates the need for separately regulating the rotational energy (i.e., power) required by the air conditioner 44 and the rotation energy required for the motor-generator 10 to output and thus enables a great deal of power to be outputted to the driven wheels 14 as compared with a maximum output of the motor-generator 10.

The structure of the power transmission device of this embodiment has the advantages (1) to (5), (10), and (11), as described above.

Figure 11A:
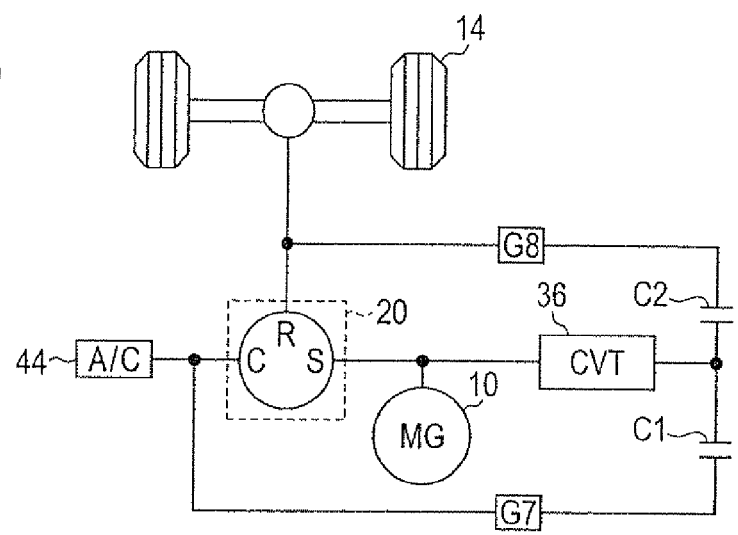
FIG. 11(a) is a schematic block diagram which shows a power transmission device according to the fifth embodiment of the invention.
Figure 11B:
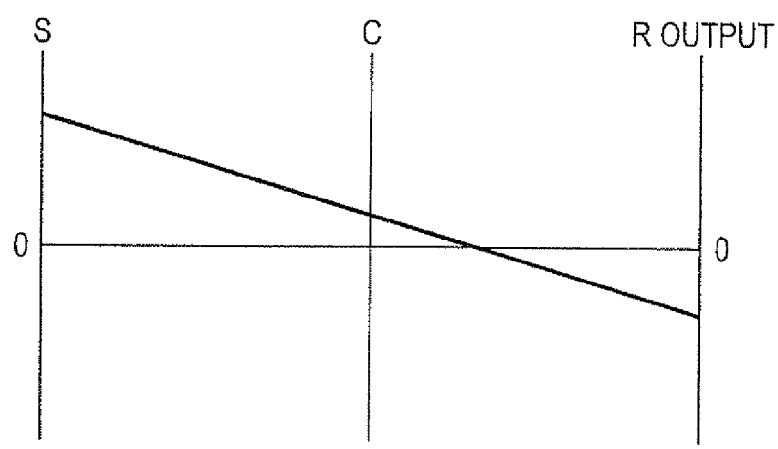
FIG. 11(b) is a nomographic chart which represents an operation of a power split device along with the speed of an internal combustion engine when driven wheels of a vehicle are run in a backward direction.
Figure 11C:
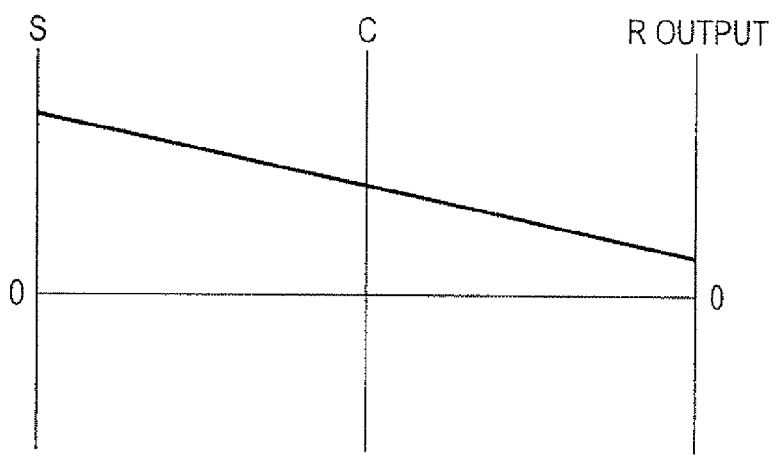
FIG. 11(c) is a nomographic chart which represents an operation of a power split device along with the speed of an internal combustion engine when driven wheels of a vehicle are run in a forward direction.

FIG. 11(*a*) illustrates the power transmission system according to the fifth embodiment of the invention which is a modification of the fourth embodiment of FIG. 10. The same reference numbers as employed in FIGS. 1 and 10 refer to the same parts, and explanation thereof in detail will be omitted here.

The power transmission system of this embodiment has, like in the fourth embodiment, the power split device 20 equipped only with a single planetary gear set.

The mechanical joints of the power split device 20 (i.e., the planetary gear set) to the motor-generator 10 and the driven wheels 14 are different from those of the second planetary gear set 24 in the first embodiment. Specifically, the sun gear S is coupled mechanically to the motor-generator 10 and also to the carrier C through the CVT 36, the clutch C1, and the gear G7. The ring gear R is coupled mechanically to the driven wheels 14 and also to the sun gear S through the gear G8, the clutch C2, and the CVT 36.

The speed of the ring gear R that is one of the rotors of the power split device 20 which is coupled to the driven wheels 14, as illustrated in FIGS. 11(*b*) and 11(*c*), lies at one of ends of the nomographic chart. The power split device 20 is so designed that the rotational directions of the sun gear S and the carrier C which are to be connected to the motor-generator 10 in the first operation mode have the same sign in the nomographic chart. This permits the driven wheels 14 to be run in the backward direction, as illustrated in FIG. 11(*b*), stopped, and then run in the forward direction, as illustrated in FIG. 11(*c*), successively without changing the sign of the rotational direction of the motor-generator 10. When running in the first operation mode, the power transmission device is capable of achieving the geared neutral through the circulation of power. The power transmission device may work to switch the first operation mode to the second operation mode when the vehicle is running in the frontward reaction and has fallen in a high-speed range for improving the energy-use efficiency. When the vehicle is running in the frontward direction, the rotational directions of the sun gear S, the carrier C, and the ring gear R will have the same sign, thus causing the power not to be circulated in the second operation mode.

The structure of the power transmission device of this embodiment has the advantages (1) to (5), (10), and (11), as described above.

Figure 12A:
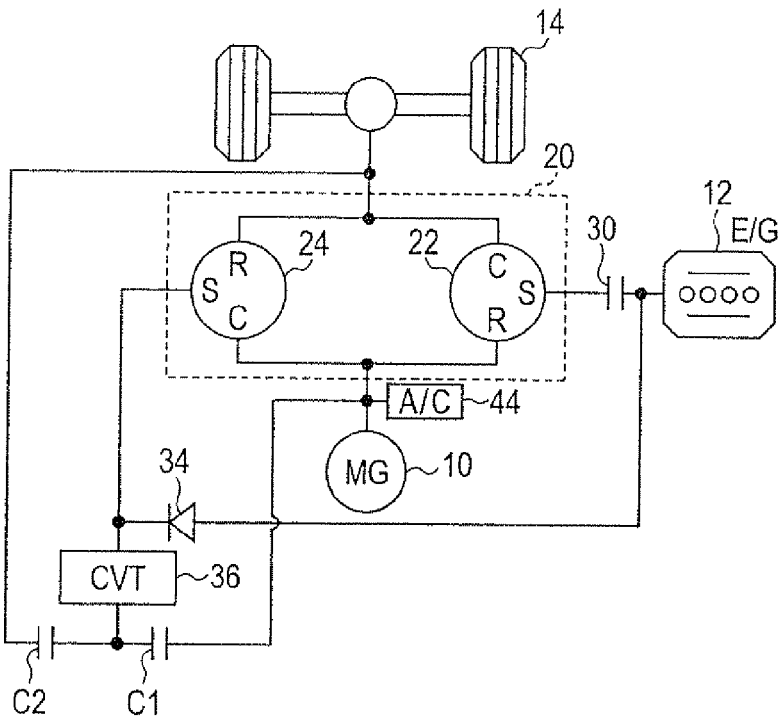
FIG. 12(a) is a schematic block diagram which shows a power transmission device according to the sixth embodiment of the invention.

FIG. 12(a) illustrates the power transmission system according to the sixth embodiment of the invention which is a modification of the second embodiment of FIG. 8. The same reference numbers as employed in FIGS. 1 and 8 refer to the same parts, and explanation thereof in detail will be omitted here.

The power split device 20 is different from the one in FIG. 8 in mechanical connection of the rotors thereof. Specifically, the carrier C of the first planetary gear set 22 is coupled mechanically to the ring gear R of the second planetary gear set 24. The ring gear R of the first planetary gear set 22 is coupled mechanically to the carrier C of the second planetary gear set 24.

The driven wheels 14 are connected mechanically to the carrier C of the first planetary gear set 22 and the ring gear R of the second planetary gear set 24 and also to the sun gear S of the second planetary gear set 24 through the clutch C2 and the CVT 36. The motor-generator 10 is connected mechanically to the ring gear R of the first planetary gear set 22 and the carrier C of the second planetary gear set 24 and also to the sun gear S of the second planetary gear set 24 through the clutch C1 and the CVT 36. The internal combustion engine 12 is connected mechanically to the sun gear S of the first planetary gear set 22 through the clutch 30 and also to the sun gear S of the second planetary gear set 24 through the one-way bearing 34. The air conditioner 44 is connected mechanically to a joint among the carrier C of the second planetary gear set 24, the ring gear R of the first planetary gear set 22, and the motor-generator 10.

In operation, the sun gear S of the first planetary gear set 22 serves as the starting rotor to start the engine 12. The sun gear S of the second planetary gear set 24 serves as the power transmission rotor. The power split device 20 is so designed that the rotational direction of the sun gear C of the second planetary gear set 24 and the ring gear R of the first planetary gear set 22 is identical in sign with that of the sun gear S of the second planetary gear set 24 in the nomographic chart.

Figure 12B:
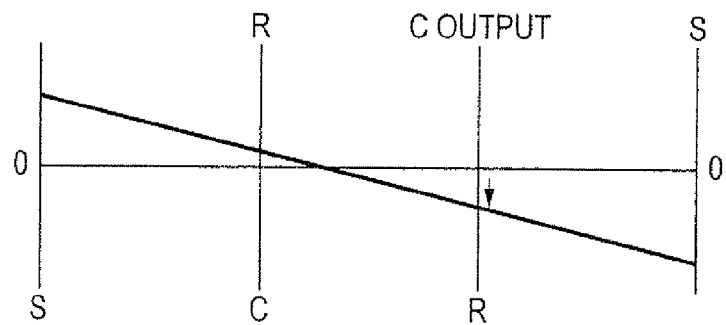
FIG. 12(b) is a nomographic chart which represents an operation of a power split device along with the speed of an internal combustion engine when driven wheels of a vehicle are run in a backward direction.
Figure 12C:
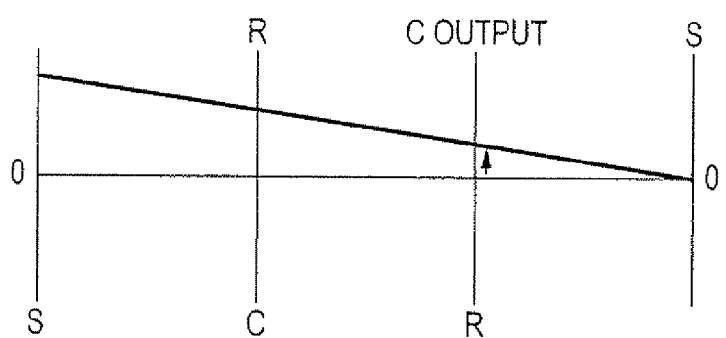
FIG. 12(c) is a nomographic chart which represents an operation of a power split device along with the speed of an internal combustion engine when driven wheels of a vehicle are run in a forward direction.

In the first operation mode, the power transmission device is capable of running the driven wheels 14 in the backward direction, as illustrated in FIG. 12(b), stopped, and then run in the forward direction, as illustrated in FIG. 12(c), successively. FIG. 12(b) demonstrate the case where the speed of the sun gear S of the first planetary gear set 22 is zero (0). When the clutch 30 is engaged in such a condition, it enables the power split device 20 to start the engine 12.

When the power transmission device is in the first operation mode, it is capable of establishing the geared neutral in which the power is circulated. When the power transmission device enters the second operation mode, the rotational directions of the sun gear S, the carrier C, and the ring gear R of the second planetary gear set 24 are identical in sign with each other, so that the rotational energies (i.e., the power) of the sun gear S and the ring gear R of the second planetary gear set 24 are identical in sign with each other. The power transmission device may start the engine 12 in the first operation mode. In this case, the first planetary gear set 22 does not contribute to the transmission of torque in the second operation mode, so that the power is not circulated in the second operation mode.

The power transmission device of this embodiment may alternatively have a gear(s) disposed between the motor-generator 10 and the driven wheels 14 or the power split device 20 and/or between the engine 12 and the driven wheels 14 or the power split device 20 in order to eliminate the omission of transmission of torque to the driven wheels 14 upon the switching between the first operation mode and the second operation mode.

The structure of the power transmission device of this embodiment has substantially the same advantages, as described in the first embodiment.

Figure 13A:
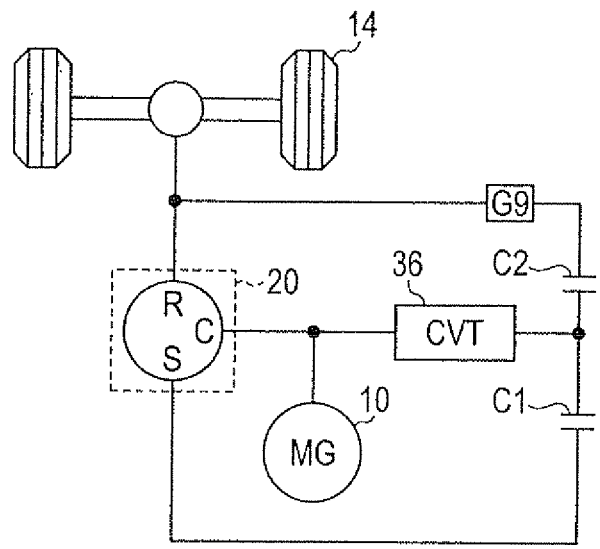
FIG. 13(a) is a schematic block diagram which shows a power transmission device according to the seventh embodiment of the invention.

FIG. 13(a) illustrates the power transmission device according to the seventh embodiment of the invention which is a modification of the fourth embodiment of FIG. 10. The same reference numbers as employed in FIGS. 1 and 10 refer to the same parts, and explanation thereof in detail will be omitted here.

The power split device 20 is, like in the fourth embodiment, made only by a single planetary gear set. The motor-generator 10 is, unlike in the fourth embodiment, coupled mechanically to the carrier C and also to the sun gear S through the CVT 36 and the clutch C1. The driven wheels 14 are coupled mechanically to the ring gear R and also to the carrier C through the gear G9, the clutch C2, and the CVT 36.

The power transmission device of this embodiment is designed to achieve the geared neutral in the first operation mode and switch from the first operation mode to the second operation mode to increase a gear ratio adjustable range. Specifically, the power transmission device is capable of changing the gear ratio of the CVT 36 in the first operation mode, as demonstrated in FIG. 13(b), to change the rotational direction of the driven wheels 14 from the backward direction to the forward direction continuously through the instant where the speed of the driven wheels 14 is zero and subsequently changing the gear ratio of the CVT 36 further to increase the total gear ratio in a power transmission path from the motor-generator 10 to the driven wheels 14. When the time the omission of the transmission of torque will not occur is reached, the power transmission device is operable to switch the first operation mode to the second operation mode and then turn the CVT 36 in the opposite direction to increase the total gear ratio further.

The above operation is achieved by selecting the direction in which the total gear ratio changes with a change in gear ratio of the CVT 36 in the second operation mode to be opposite that in the first operation mode. This is established in the condition that a derivative value of a function in which the gear ratio of the CVT 36 is expressed by an independent variable, and the total gear ratio is expressed by a dependent variable with respect to the gear ratio of the CVT 36 in the second operation mode is opposite in sign to that in the first operation mode. This condition is achieved by the gear G9. The gear G9 is designed not to reverse the sign of the rotational speed on the output side thereof to that on the input side thereof and to have a gear ratio which avoids the omission of the transmission of torque to the driven wheels 14.

Other Embodiments

The power transmission devices of the above embodiments may be modified as discussed below.
Type of Speed Variator The CVT 36 needs not be of a belt-type. For example, a traction drive type or hydraulic continuously variable transmission may be used. Alternatively, a gear transmission may be used instead of the CVT 36.

Arrangement of Gear Gn

The power transmission device may alternatively have the following gears disposed among the power split device 20, the motor-generator 10, the engine 12, and the driven wheels 14.

Figure 14:
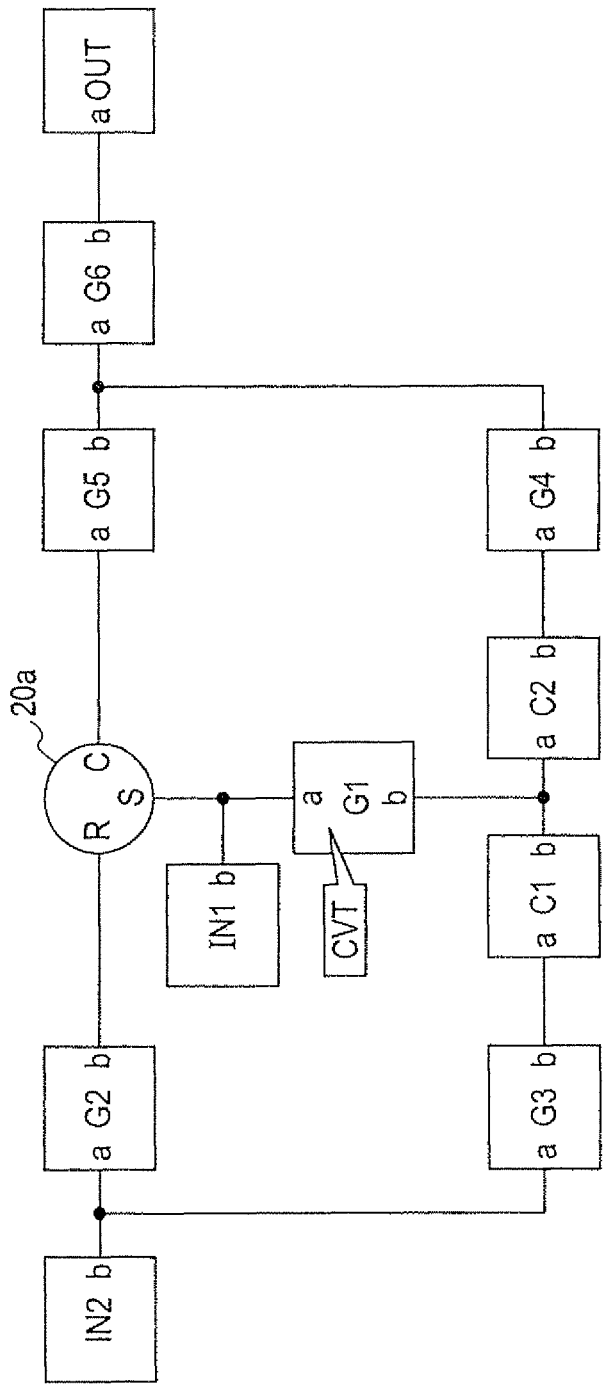
FIG. 14 is a block diagram which shows a possible gear arrangement of a power transmission device of the invention.

For example, in the case where the power split device 20 consists of a single planetary gear set in which mechanical joints of the rotors are changed, like in the first to fourth embodiments, between the first operation mode and the second operation mode and is designed to output the power from the carrier C, the power transmission device may include gears G1 to G6, as illustrated in FIG. 14. Note that the gear G1 in each of the first to fourth embodiments is designed as a speed variator (i.e., the CVT 36). The power transmission device in each of the first to fourth embodiments may alternatively include some of the gears G2 to G6. At least one of the gears G2 and G3 needs not be a counter gear in order for the rotational directions of the sun gear S and the ring gear R to have sign different from each other in the nomographic chart. Specifically, the power transmission device in each of the first to fourth embodiments is designed to have the carrier C whose speed will be zero (0) when the rotational directions of the sun gear S and the ring gear R have signs opposite to each other and thus needs the counter gear. However, when the power transmission device is designed to have the carrier C whose speed will be zero (0) when the rotational directions of the sun gear S and the ring gear R have signs identical with each other, the counter gear is not needed. In this case, the power split device 20 is implemented by a double-planetary gear set, as taught in, for example, Japanese Patent First Publication No. 2001-108073.

The total gear ratios in the first and second operation modes, conditions in which the first operation mode is switched to the second operation mode without omission of the transmission of torque to the driven wheels 14, and conditions in which the neutral point is established in the power transmission device equipped with the gears G1 to G6 will be described below. In the case where at least one of the gears G1 to G6 is not used, the following conditions are met if the gear ratio of the one of the gears G1 to G6 is defined to be one (1).

The gear ratio rn of the gear Gn (n=1 to 6) is defined as a ratio of speed a to speed b in FIG. 14. The number of teeth of the sun gear S/the number of teeth of the ring gear R is defined as a gear ratio a. The rotational speeds of the sun gear S, the ring gear R, and the carrier C are defined as wS, wR, and wC, respectively. Equation (c5) is met.

$$awS-(1+a)wC+wR=0 \quad (c5)$$

1 Total Gear Ration of Power Transmission Path from IN1 to Out in First Operation Mode The rotational speed at the input IN1 is the rotational speed wS. The rotational speed wR is given by $wSr1r2/r3$. The rotational speed at the output OUT is given by $wCr5r6$. From Eq. (c5), the total gear ratio is expressed by Eq. (c6) below.

$$\{r5r6(ar3+r1r2)\}/\{(1+a)r3\} \quad (c6)$$

2 Total Gear Ration of Power Transmission Path from IN2 to Out in First Operation Mode The rotational speed at the input IN2 is expressed by $wR/r2$. By substituting the rotational speeds wS and wC which are expressed by speeds at the input IN2 and the output OUT into Eq. (c5), the total gear ratio is given by $$\{r5r6(ar3+r2r1)\}/\{(1+a)r1\} \quad (c7)$$

3 Total Gear Ration of Power Transmission Path from IN2 to Out in Second Operation Mode By substituting the rotational speeds Wr, wS and wC which are expressed by speeds at the input IN2 and the output OUT into Eq. (c5), the total gear ratio is given by $$r1r2r4f5f6/\{a(r1r4-r5)+r1r4\} \quad (c8)$$

4 Total Gear Ration of Power Transmission Path from IN1 to Out in Second Operation Mode By expressing the rotational speeds wR, wS, and wC in the rotational speeds at the input IN2 and the output OUT using Eq. (8c) and then substituting them into Eq. (5c), the total gear ratio is given by $$r1r4r6 \quad (c9)$$

5 Condition in which No Omission of Transmission of Torque Occurs

The gear ratio r1 of the CVT 36 which results in no omission of transmission of torque to the driven wheels 14 in the first operation mode needs to satisfy the condition in which the speed b of the gear G1 is equal to the speed a of the gear G4. The gear ratio r1 is, thus, given by $$r1=ar3r5/(r3r4+ar3r4-r2r5) \quad (c10)$$

In order to eliminate the omission of transmission of torque, it is necessary to select an adjustable range of the gear ratio of the CVT 36 so as to satisfy Eq. (c10).

6 Gear ration of CVT 36 at Neutral Point

When the rotational speed wC of the carrier C in the first operation mode is set to zero (0), the following Eq. (c11) is satisfied.

$$r1=-ar3/r2 \quad (c11)$$

The power transmission device of the fifth to seventh embodiment may also be designed to have all or some of the gears G1 to G6 in the same manner, as described above.

Turning CVT 36 in Opposite Direction in Seventh Embodiment of FIG. 13

The turning of the CVT 36 in the opposite direction may be achieved by the structure other than the one in the seventh embodiment, as described above, as long as the ratio of a change in total gear ratio to that in gear ratio of the CVT 36 changes in sign between the first and second operation modes. This may be established in the power transmission devices of the first to fourth embodiments. Specifically, the above condition with respect to the total gear ratio in the power transmission path in which the power is inputted at the input IN1 in FIG. 14 is satisfied when the product of a coefficient of the gear ratio r1 in Eq. (c6) and a coefficient of the gear ratio r1 in Eq. (c9) is negative in sign, that is, when a relation of $r2r4r5/r3<0$ is met. In other words, the turning of the CVT 36 in the opposite direction is achieved by installing at least one of the gears G2, G3, G5, and G6 in the power transmission device so as to meet the relation of $r2r4r5/r3<0$. The at least one of the gears G2, G3, G5, and G6 is designed to have a gear ratio (i.e., an output-to-input speed ratio) required to establish the turning of the CVT 36 in the opposite direction. Note that the gear ratio may be −1. The above condition is dependent only on the number of counter gears. The at least one of the gears G2, G3, G5, and G6 needs not have a fixed gear ratio, but may be designed to be capable of changing the gear ratio variably and fixing it at a desired value.

The above discussion is made using the fact that Eqs. (c6) and (c9) are linear functions. Eqs. (c7) and (c8) in which the input IN2 is defined as a power input are, however, not linear functions of the gear ratio r1. Therefore, the condition in which the product of values derived by differentiating a function in which the gear ratio r1 is expressed by an independent variable, and the total gear ratio is expressed by a dependent variable with respect to the gear ratio r1 in the first operation mode and in the second operation mode is negative needs be satisfied.

Figure 13B:
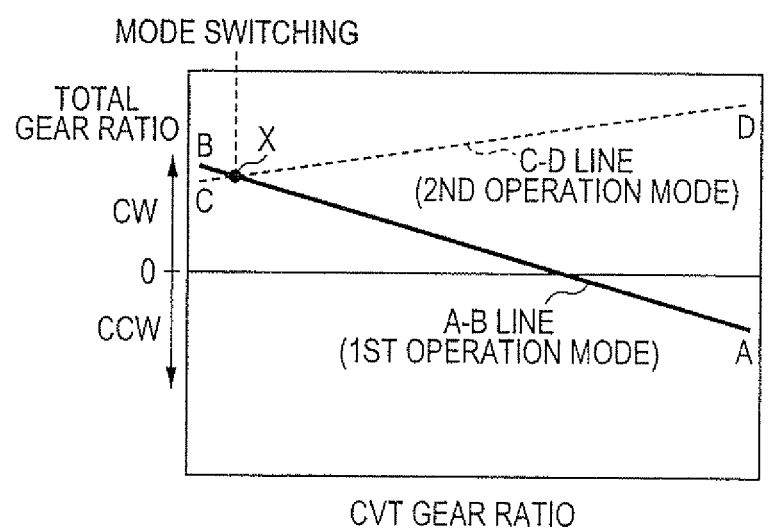
FIG. 13(b) is a view which represents a change in total output-to-input speed ratio of the power transmission device of FIG. 13(a)

The condition in which the product of values derived in the first operation mode and the second operation mode by is differentiating the function in which the gear ratio r1 is expressed by an independent variable, and the total gear ratio is expressed by a dependent variable with respect to the gear ratio r1 is also required to achieve the turning of the CVT 36 in the opposite direction in examples other than the one, as described above, but is not necessarily met over a range (will also be referred to as an r1-range below) in which the gear ratio r1 is permitted to change. Referring to FIG. 13(b), the gear ratio r1 (i.e., the output-to-input speed ratio of the CVT 36) is changed in a direction of a point A to a point B in the first operation mode, while it is changed in a direction of a point C to a point D in the second operation mode. The first operation mode is switched to the second operation mode at a switching point X where the line A-B intersects with the line C-D. If the switching point X lies within the r1-range, it is possible to switch the first operation mode to the second operation mode without the omission of transmission of torque to the driven wheels 14. In other words, the first-to-second operation mode switching may be established without the omission of transmission of torque as long as the switching point X lies on the right side of the intersection of the A-B line and the C-D line, as viewed in FIG. 13(b). However, if the clutches C1 and C2 are so designed as to have a partially engaged state where the power is transmitted through the clutches C1 and C2 being slipping, it is possible to achieve the first-to-second operation mode switching with minimum omission of transmission of torque to the driven wheels 14. In this case, it is possible to place the switching point X on the left side of the intersection of the A-B line and the C-D line, as viewed in FIG. 13(b).

The circulation of the power in the second operation mode is not always avoided in the structure which is capable of achieving the turning of the CVT 36 in the opposite direction. For example, in the structure of the power transmission device having the gear arrangement, as schematically illustrated in FIG. 14, the geared neutral is established only when the load exerted on the input IN2 is zero (0). This is because in order to establish the geared neutral in the case where the CVT 36 is of a belt type, so that a relation of r1>0 is met, the rotational direction of the sun gear S needs to be different in sign from that of the ring gear R, and therefore, a relation of r2r3<0 needs to be satisfied. The elimination of the circulation of power in the second operation mode requires, as can be seen from Eq. (2c), the rotational direction of the sun gear S to be opposed in sign to that of the carrier C, so that a relation of r4r5<0 needs to be satisfied. This does not meet the above described condition of r2r4r5/r3<0. However, the planetary gear set 20a does not contribute to the transmission of power in the second operation mode as long as no load is exerted on the input IN2, thus avoiding the circulation of the power in the power transmission device. This standpoint shows that the power transmission devices of the third and fourth embodiments are effective to be modified to establish the turning of the CVT 36 in the opposite direction, i.e., to reverse the CVT 36 in terms of the structure, as schematically illustrated in FIG. 14. Note that the planetary gear set 20a in FIG. 14 corresponds to, for example, the second planetary gear set 24 in the first embodiment.

Figure 15A:
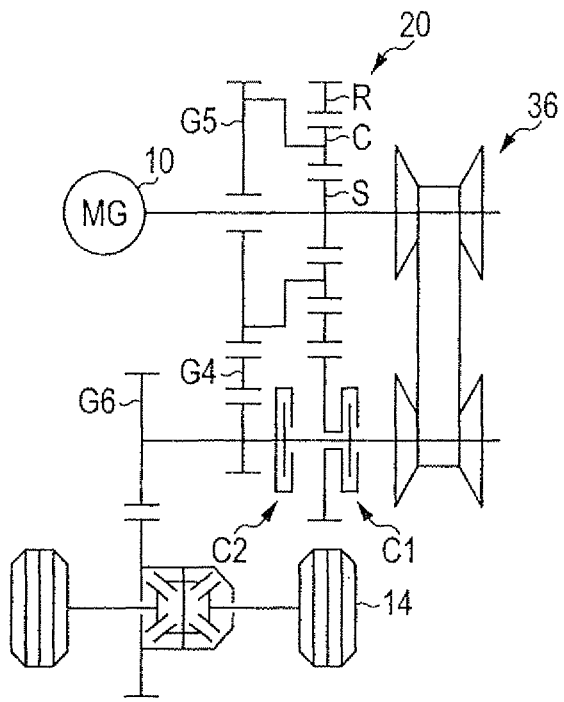
FIG. 15(a) is a skeleton view of a modified form of a power transmission device.
Figure 15B:
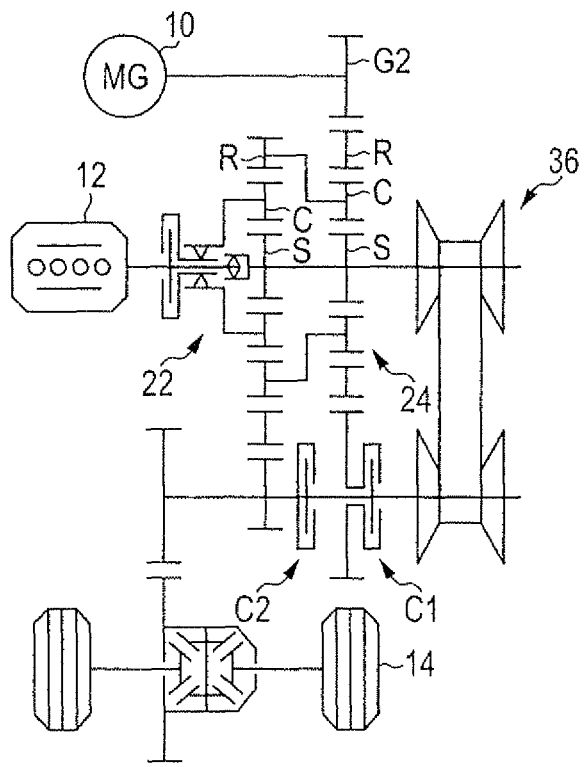
FIG. 15(b) is a skeleton view of a modified form of a power transmission device.

FIG. 15(a) shows an example in which the motor-generator 10 is joined to the input IN1 in the structure of FIG. 14 to achieve the turning of the CVT 36 in the opposite direction. FIG. 15(b) shows an example in which the structure of the power transmission device of the first embodiment is modified to achieve the turning of the CVT 36 in the opposite direction. The power transmission devices of FIGS. 15(a) and 15(b) are illustrated as being installed in front-engine front-wheel drive (FF) vehicles, but may alternatively be mounted in front-engine rear-wheel drive (FR) vehicles.

Connection of Power Source and Power-Driven Member

The mechanical connections of the planetary gear set(s) of the power transmission device 20 to the power source (i.e., the motor-generator 10 or the engine 12) and a power-driven member (i.e., the driven wheels 14) are not limited to the ones, as described in the above embodiments.

Figure 16A:
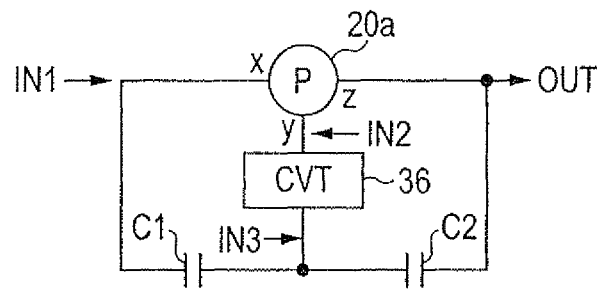
FIGS. 16(a), 16(b), and 16(c) are views which illustrate examples of possible mechanical connections of a planetary gear set to power source(s) and a power-driven member.
Figure 16B:
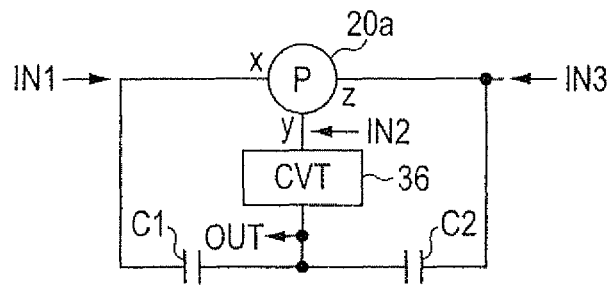
Figure 16C:
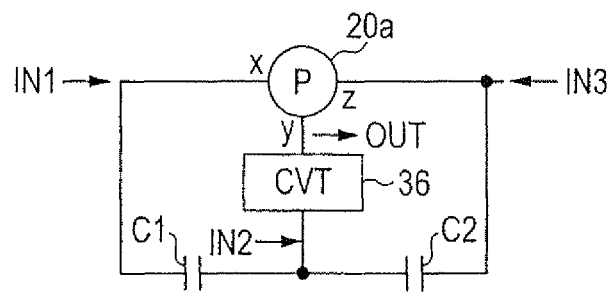

FIGS. 16(a), 16(b), and 16(c) illustrate examples of possible mechanical connections of the planetary gear set 20a to power source(s) and the power-driven member. Inputs IN1 to IN3 are mechanical joints to which the power sources are to be connected. In FIGS. 16(a) to 16(c), at least one of the inputs IN1 to IN3 is coupled to the power source. An out OUT is a mechanical joint to the power-driven member. Three lines extending from the planetary gear set 20a indicate axes coupled mechanically to the sun gear S, the ring gear R, and the carrier C, respectively. Specifically, all possible correspondence combinations of a set of rotors x, y, and z, as illustrated in the drawing, with a set of the sun gear S, the carrier C, and the ring gear R of the planetary gear set 20a are (x, y, z)=(S, C, R), (S, R, q, (C, S, R), (C, R, S), (R, S, q, and (R, C, S).

If the carrier C of the planetary gear set 20a of FIG. 16(a) is coupled mechanically to the power-driven member (i.e., the out OUT), the structure of FIG. 16(a) includes the one in each of the first to fourth and sixth embodiments. For example, in the case of the first embodiment, the input IN1 is the motor-generator 10. The input IN2 is the engine 12. The input IN3 may alternatively be coupled to the power source. Specifically, the output of the one-way bearing 34 may be coupled to a joint among the CVT 36, and the clutches C1 and C2.

If the ring gear R of the planetary gear set 20a of FIG. 16(a) is coupled mechanically to the power-driven member (i.e., the out OUT), the structure of FIG. 16(a) includes the one in each of the fifth to seventh embodiments. However, the structure of FIG. 16(a) also includes the power transmission device in which the sun gear S of the planetary gear set 20a is coupled mechanically to the power-driven member (i.e., the output OUT).

FIG. 16(b) represents the power transmission device in which the power-driven member is coupled to a joint of the CVT 36 and the clutches C1 and C2.

FIG. 16(c) represents the power transmission device in which the power-driven member is coupled between the planetary gear set 20a and the CVT 36.

Layout of Speed Variator (CVT 36)

Figure 17A:
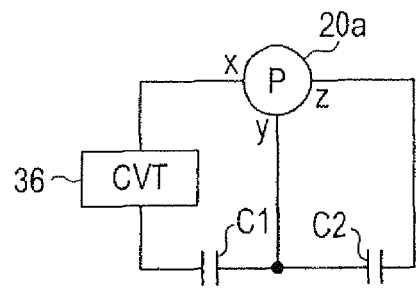
FIGS. 17(a) and 17(b) are block diagrams which show possible layouts of a speed variator in a power transmission device of the invention.

Instead of being disposed among the planetary gear set 20a and the clutches C1 and C2, the CVT 36 may be, as illustrated in FIG. 17(a), coupled between the clutch C1 and the rotor x of the planetary gear set 20a. Here, the functions of the clutches C1 and C2 are not specified. Specifically, in the case where the power transmission device of the first embodiment is modified to have the structure of FIG. 17(a), the CVT 36 may be disposed between the ring gear R of the second planetary gear set 24 and the clutch C1 or between the clutch C2 and the gear G4.s The mechanical joint between the power source and the power-driven member in FIG. 17(a) may include the one, as illustrated in each of FIGS. 16(a) to 16(c).

The power transmission device may be equipped with two speed variators. For example, the power transmission device may have two speed variators (e.g., CVTs) one disposed, as illustrated in FIG. 16(a), and the other disposed, as illustrated in FIG. 17(a).

Figure 17B:
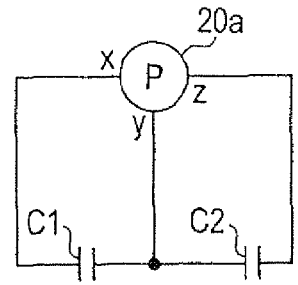

The power transmission device may alternatively be equipped with no speed variator. For example, the power transmission device may be designed, as illustrated in FIG. 17(b), to have the clutch C1 which establishes or blocks a mechanical connection between the rotors x and y of the planetary gear set 20a and the clutch C2 which establishes or blocks a mechanical connection between the rotors y and z of the planetary gear set 20a.

Structure of Power Split Device 20

Figure 18A:
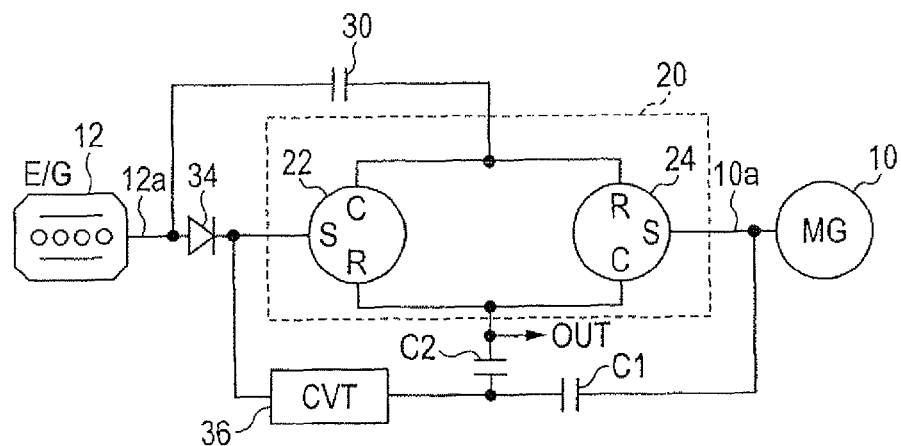
FIGS. 18(a) and 18(b) are block diagrams which show modified forms of the power transmission device of the first embodiment.
Figure 18B:
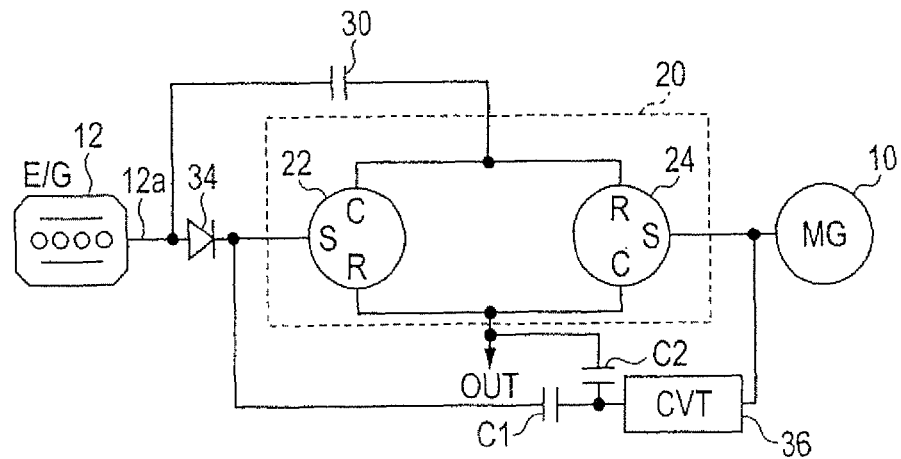

The power split device 20 is not limited to the structure in which a first and a second rotor that are two of the sun gear S, the ring gear R, and the carrier C of the planetary gear set are connected or disconnected by the clutch C1, and the second rotor and a third rotor that is the remaining one of the sun gear S, the ring gear R, and the carrier C are connected or disconnected by the clutch C2. FIGS. 18(a) to 20(b) illustrate modifications of the power transmission device equipped with the power split device 20 made up of the first and second planetary gear sets 22 and 24. The modifications are different in mechanical connections of the rotors of the power split device 20 from the power transmission devices of the above embodiments. In FIGS. 18(a) to 20(b), gears disposed among the motor-generator 10, the engine 12, the driven wheels 14, and the power split device 20 are omitted for the brevity of illustration.

a) Structure in FIGS. 18(a) and 18(b)

The power split devices 20, as illustrated in FIGS. 18(a) and 18(b), have the carrier C of the first planetary gear set 22 connected mechanically to the ring gear R of the second planetary gear set 24. The carrier C and the ring gear R serve as the starting rotors to exert the initial torque to the engine 12. The ring gear R of the first planetary gear set 22 and the carrier C of the second planetary gear set 24 are coupled mechanically to each other and also to the driven wheels 14. Note that FIGS. 18(a) and 18(b) omit the driven wheels 14, and instead indicate a portion of the power transmission path joined to the driven wheels 14 by "OUT" for the sake of simplicity of illustration. Additionally, the sun gar S of the first planetary gear set 22 is used as the power transmission rotor to which the torque of the engine 12 is transmitted and also coupled mechanically to the motor-generator 10 through the CVT 36 and the clutch The rotating shaft 12a of the motor-generator 10 is connected mechanically to the sun gear S of the second planetary gear set 24.

When the power transmission device in each of FIGS. 18(a) and 18(b) enters the first operation mode, so that the clutch C1 is engaged, and the clutch C2 is disengaged, the sun gear S of the first planetary gear set 22 is coupled mechanically to the sun gear S of the second planetary gear set 24 through the CVT 36 and the clutch C1, so that the rotational directions of the sun gears S of the first and second planetary gear sets 22 and 24 lie at the ends of the nomographic chart, respectively. The geared neutral is, therefore, achieved by making the rotational directions of the sun gears S have signs opposite to each other.

When the power transmission device in FIG. 18(a) enters the second operation mode, so that the clutch C1 is disengaged, and the clutch C2 is engaged, the ring gear R of the first planetary gear set 22 and the carrier C of the second planetary gear set 24 are coupled mechanically to the sun gear S of the first planetary gear set 22 through the CVT 36. The signs of the rotational energy (i.e., the power) of the sun gear S and the ring gear R of the first planetary gear set 22 may be set identical with each other in the nomographic chart by making the rotational directions of the sun gear S, the ring gear R, and the carrier C of the first planetary gear set 22 have the same sign. In other words, the power split mode, as described above already, is established without the circulation of the power in the power transmission device. The advantages (1) to (4), as described in the first embodiment, are obtained regardless of the power split mode.

Figure 19A:
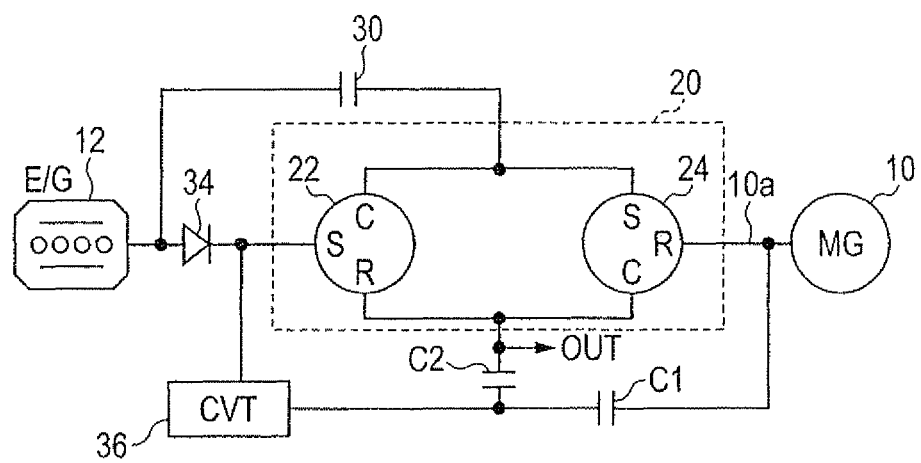
FIGS. 19(a) and 19(b) are block diagrams which show modified forms of the power transmission device of the first embodiment.
Figure 19B:
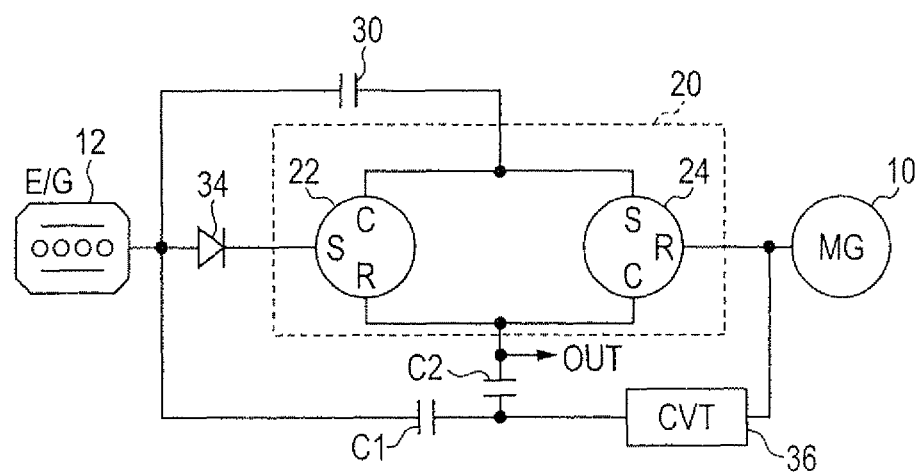

When the power transmission device in FIG. 18(b) enters the second operation mode, so that the clutch C1 is disengaged, and the clutch C2 is engaged, the ring gear R of the first planetary gear set 22 and the carrier C of the second planetary gear set 24 are coupled mechanically to the sun gear S of the second planetary gear set 24 through the CVT 36. The signs of the rotational energy (i.e., the power) of the sun gear S and the carrier C of the second planetary gear set 24 may be set identical with each other in the nomographic chart by making the rotational directions of the sun gear S and the carrier C of the second planetary gear set 24 have signs different from each other. In other words, the power split mode is established without the circulation of the power in the power transmission device. The advantages (1) to (4), as described in the first embodiment, are obtained regardless of the power split mode.

b) Structure in FIGS. 19(a) and 19(b)

The power split devices 20, as illustrated in FIGS. 19(a) and 19(b), have the carrier C of the first planetary gear set 22 connected mechanically to the sun gear S of the second planetary gear set 24. The carrier C and the sun gear S serve as the starting rotors to exert the initial torque to the engine 12. The ring gear R of the first planetary gear set 22 and the carrier C of the second planetary gear set 24 are coupled mechanically to each other and also to the driven wheels 14. Note that FIGS. 19(a) and 19(b) omit the driven wheels 14, and instead indicate a portion of the power transmission path joined to the driven wheels 14 by "OUT" for the sake of simplicity of illustration. Additionally, the sun gar S of the first planetary gear set 22 is used as the power transmission rotor to which the torque of the engine 12 is transmitted and also coupled mechanically to the motor-generator 10 through the CVT 36. The rotating shaft 12a of the motor-generator 10 is connected mechanically to the ring gear R of the second planetary gear set 24.

When the power transmission device in each of FIGS. 18(a) and 18(b) enters the first operation mode, so that the clutch C1 is engaged, and the clutch C2 is disengaged, the sun gear S of the first planetary gear set 22 is coupled mechanically to the ring gear R of the second planetary gear set 24 through the CVT 36 and the clutch C1, so that the rotational directions of the sun gear S of the first planetary gear set 22 and the ring gear R of the second planetary gear set 24 lie at the ends of the nomographic chart, respectively. The geared neutral is, therefore, achieved by making the rotational directions of the sun gear S and the ring gear R have signs opposite to each other.

When the power transmission device in FIG. 19(a) enters the second operation mode, so that the clutch C1 is disengaged, and the clutch C2 is engaged, the ring gear R of the first planetary gear set 22 and the carrier C of the second planetary gear set 24 are coupled mechanically to the sun gear S of the first planetary gear set 22 through the CVT 36. The signs of the rotational energy (i.e., the power) of the sun gear S and the ring gear R of the first planetary gear set 22 may be set identical with each other in the nomographic chart by making the rotational directions of the sun gear S, the ring gear R, and the carrier C of the first planetary gear set 22 have the same sign. In other words, the power split mode is established without the circulation of the power in the power transmission device. The advantages (1) to (4), as described in the first embodiment, are obtained regardless of the power split mode.

Figure 20A:
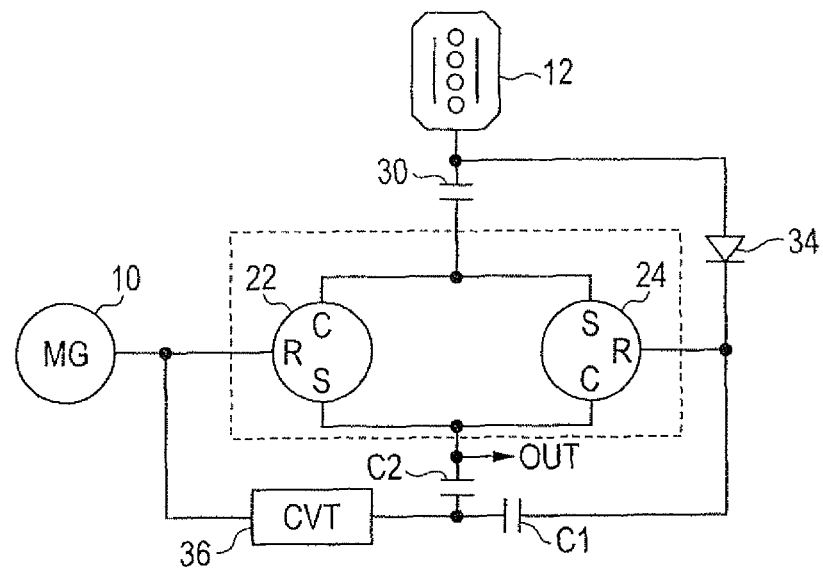
FIGS. 20(a) and 20(b) are block diagrams which show modified forms of the power transmission device of the first embodiment.
Figure 20B:
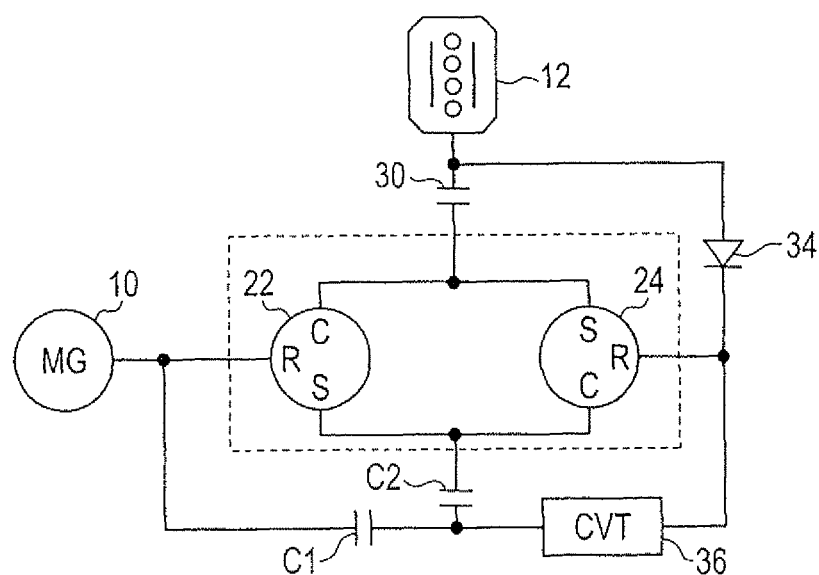
Figures 21A, 21B, 21C, 21D, 21E, 21F, 21G, 21H, 21I, 21J:
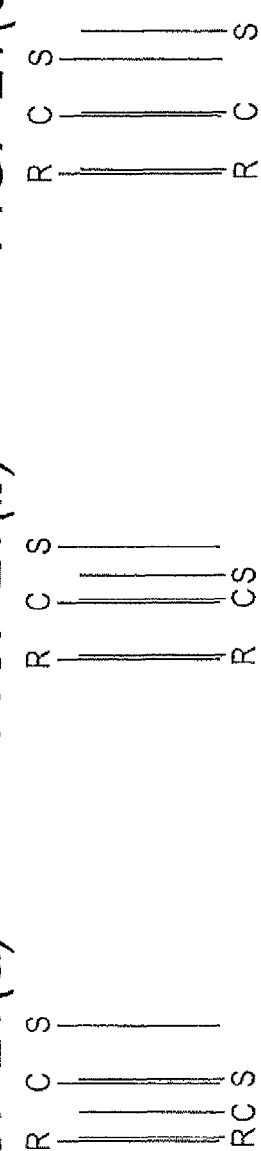
FIGS. 21(a) to 21(j) are nomographic charts which represent modified structures of a power split device of the invention.

When the power transmission device in FIG. 19(b) enters the second operation mode, so that the clutch C1 is disengaged, and the clutch C2 is engaged, the ring gear R of the first planetary gear set 22 and the carrier C of the second planetary gear set 24 are coupled mechanically to the ring gear R of the second planetary gear set 24 through the CVT 36. The signs of the rotational energy (i.e., the power) of the carrier C and the ring gear R of the second planetary gear set 24 may be set identical with each other in the nomographic chart by making the rotational directions of the carrier C and the ring gear R of the second planetary gear set 24 have signs different from each other. In other words, the power split mode is established without the circulation of the power in the power transmission device. The advantages (1) to (4), as described in the first embodiment, are obtained regardless of the power split mode.

c) Structure in FIGS. 20(a) and 20(b)

The power split devices 20, as illustrated in FIGS. 20(a) and 20(b), have the carrier C of the first planetary gear set 22 connected mechanically to the sun gear S of the second planetary gear set 24. The carrier C and the sun gear S serve as the starting rotors to exert the initial torque to the engine 12. The sun gear S of the first planetary gear set 22 and the carrier C of the second planetary gear set 24 are coupled mechanically to each other and also to the driven wheels 14. Note that FIGS. 20(a) and 20(b) omit the driven wheels 14, and instead indicate a portion of the power transmission path joined to the driven wheels 14 by "OUT" for the sake of simplicity of illustration. Additionally, the ring gear R of the second planetary gear set 24 is used as the power transmission rotor to which the torque of the engine 12 is transmitted and also coupled mechanically to the motor-generator 10 through the CVT 36. The rotating shaft 12a of the motor-generator 10 is connected mechanically to the ring gear R of the first planetary gear set 22.

When the power transmission device in each of FIGS. 20(a) and 20(b) enters the first operation mode, so that the clutch C1 is engaged, and the clutch C2 is disengaged, the ring gear R of the first planetary gear set 22 is coupled mechanically to the ring gear R of the second planetary gear set 24 through the CVT 36 and the clutch C1, so that the rotational directions of the ring gears R of the first planetary gear set 22 and the second planetary gear set 24 lie at the ends of the nomographic chart, respectively. The geared neutral is, therefore, achieved by making the rotational directions of the ring gears R have signs opposite to each other.

When the power transmission device in FIG. 20(a) enters the second operation mode, so that the clutch C1 is disengaged, and the clutch C2 is engaged, the sun gear S of the first planetary gear set 22 and the carrier C of the second planetary gear set 24 are coupled mechanically to the ring gear R of the first planetary gear set 22 through the CVT 36. The signs of the rotational energy (i.e., the power) of the sun gear S and the ring gear R of the first planetary gear set 22 may be set identical with each other in the nomographic chart by making the rotational directions of the sun gear S, the ring gear R, and the carrier C of the first planetary gear set 22 have the same sign. In other words, the power split mode is established without the circulation of the power in the power transmission device. The advantages (1) to (4), as described in the first embodiment, are obtained regardless of the power split mode.

When the power transmission device in FIG. 20(b) enters the second operation mode, so that the clutch C1 is disengaged, and the clutch C2 is engaged, the sun gear S of the first planetary gear set 22 and the carrier C of the second planetary gear set 24 are coupled mechanically to the ring gear R of the second planetary gear set 24 through the CVT 36. The signs of the rotational energy (i.e., the power) of the carrier C and the ring gear R of the second planetary gear set 24 may be set identical with each other in the nomographic chart by making the rotational directions of the carrier C and the ring gear R of the second planetary gear set 24 have signs different from each other. In other words, the power split mode is established without the circulation of the power in the power transmission device. The advantages (1) to (4), as described in the first embodiment, are obtained regardless of the power split mode.

d) Additional Commonization of Power Split Device

The power split device 20 in which two of the three rotors (i.e., the sun gear S, the carrier C, and the ring gear R) of one of the first and second planetary gear sets 22 and 24 are coupled mechanically to two of the three rotors (i.e., the sun gear S, the carrier C, and the ring gear R) of the other of the first and second planetary gear sets 22 and 24 may alternatively be designed to have structures different from those described in FIGS. 18(a) to 20(c). FIGS. 21(a) to 21(j) and FIGS. 22(a) to 22(j) are nomographic charts illustrating possible modifications of the first and second planetary gear sets 22 and 24. Each of the nomographic charts represents a relation in connection between a total of six rotors of the first and second planetary gear sets 22 and 24 and a relation of four different speeds, as expressed by straight lines extending parallel to each other in the nomographic chart, to the six rotors of the first and second planetary gear sets 22 and 24. Note that the ratio of the number of teeth of the run gear S to that of the ring gear R is, however, indicated schematically for the sake of convenience.

In each of the nomographic charts, the sun gear S, the carrier C, and the ring gear R of the first planetary gear set 22 are illustrated on the upper side. For example, in FIGS. 21(b) and 21(c), the ring gears R of the first and second planetary gear sets 22 and 24 are expressed by two straight lines extending close to each other, which means that they are connected mechanically to each other. Similarly, the carriers C of the first and second planetary gear sets 22 and 14 are expressed by two straight lines extending close to each other, which means that they are connected mechanically to each other. Which of the ratio of the number of teeth of the sun gear S to that of the ring gear R of the first planetary gear set 22 and the ratio of the number of teeth of the sun gear S to that of the ring gear R of the second planetary gear set 24 is greater is represented by lateral locations of the vertical lines indicating the sun gears S. The same advantages, as described in the first embodiment, may be obtained by connecting the motor-generator 10 to the rotor of the power split device 20 which lies in speed at the right or left end in the nomographic chart, and connecting the rotors having intermediate speeds to the engine 12 as the starting rotors and to the driven wheels 14, respectively from the left in the nomographic chart. Further, the same advantages, as described in the sixth embodiment, may be obtained by connecting right or left two of the rotors in the nomographic chart to the driven wheels 14 and the engine 12 as the starting rotor.

Figure 23A:
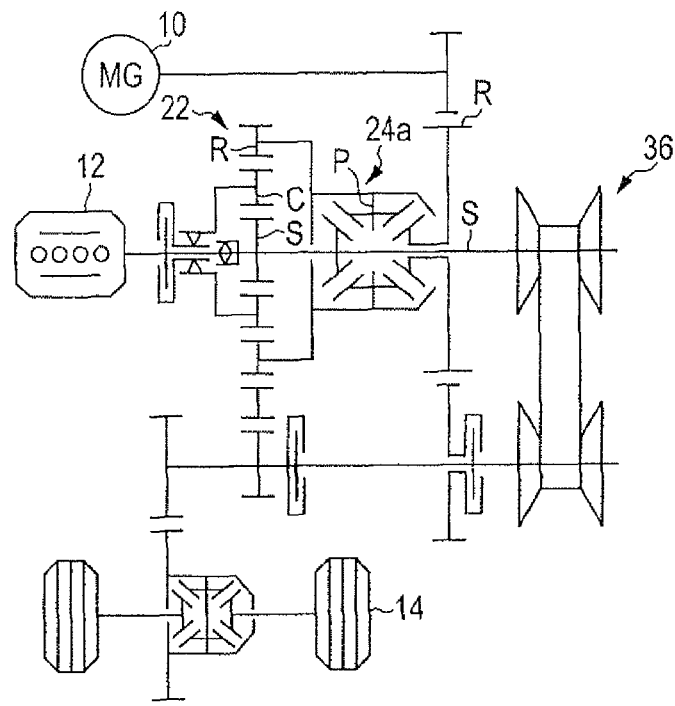
FIGS. 23(a) and 23(b) are skeleton views of modified forms of a power transmission device.
Figure 23B:
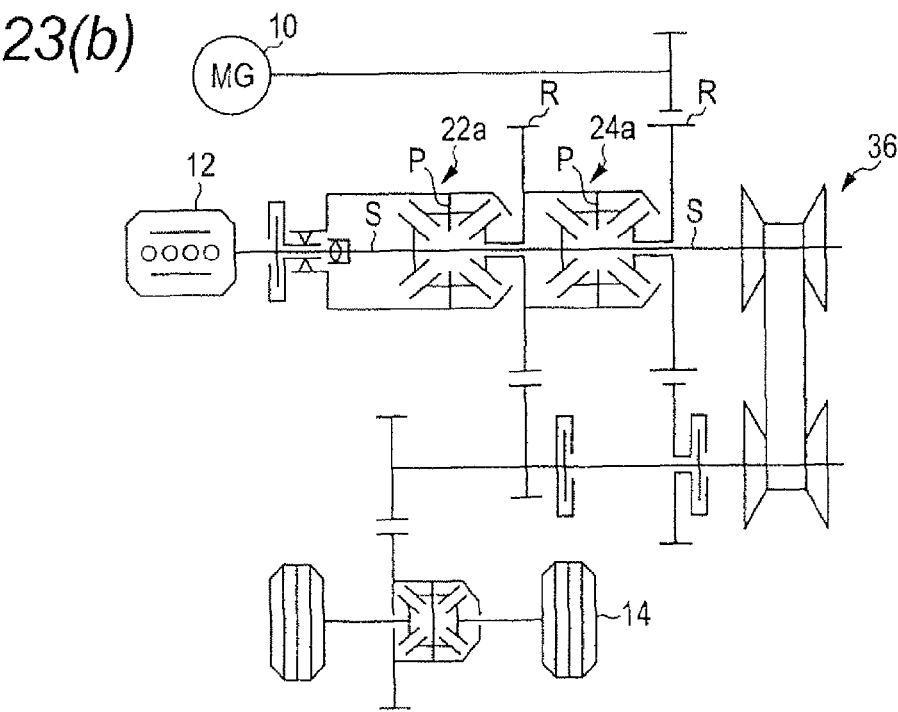

The power split device 20 may alternatively be designed not to have the structure in which any two of the three rotors of the first planetary gear set 22 are coupled mechanically to any two of the three rotors of the second planetary gear set 24. For example, the power split device 20 may be equipped with a differential gear. FIGS. 23(a) and 23(b) illustrate examples in which a differential gear is used in the structure of the first embodiment.

The power transmission device of FIG. 23(a) has a differential gear 24a instead of the second planetary gear set 24 in the first embodiment. The side gear S of the differential gear 24a is coupled mechanically to the sun gear S of the first planetary gear set 22. The pinion gear P (i.e., a differential case) of the differentia gear 24a is coupled mechanically to the ring gear R of the first planetary gear set 22. The ring gear R of the differential gear 24a is coupled mechanically to the motor-generator 10. The power transmission device of FIG. 23(b) has differential gears 22a and 24a instead of the first and second planetary gear sets 22 and 24 used in the first embodiment. The power transmission devices of FIGS. 23(a) and 23(b) are illustrated as being installed in front-engine front-wheel drive (FF) vehicles, but may alternatively be mounted in front-engine rear-wheel drive (FR) vehicles.

Power Transmission Breaker for Starting Engine

Figure 24:
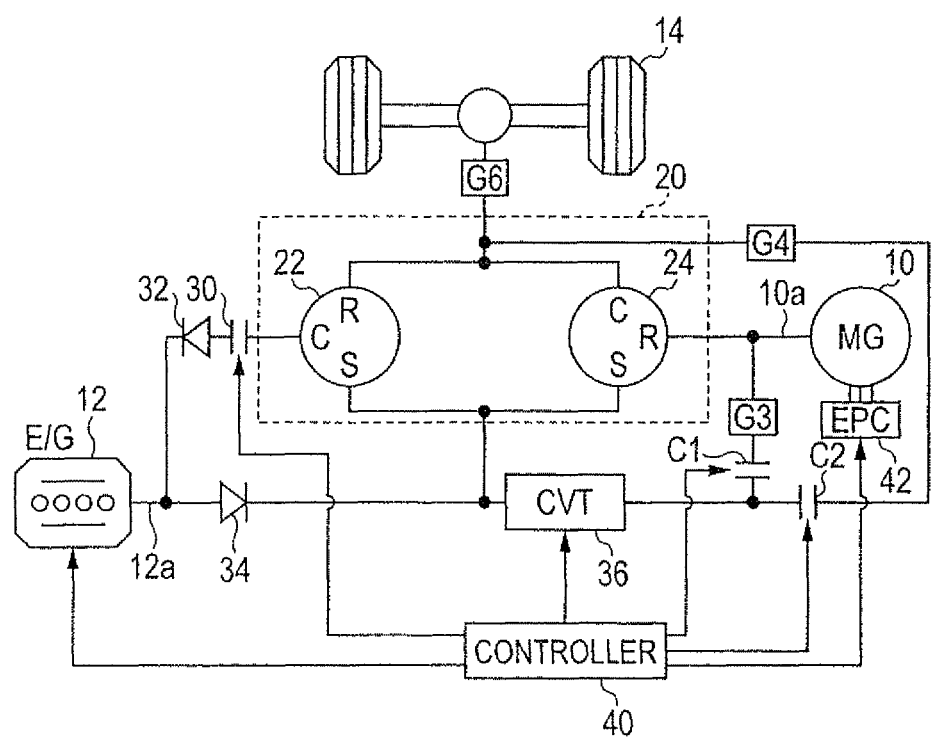
FIG. 24 is a block diagram which shows a modified form of the power transmission device of the first embodiment.

The power transmission breaker working to establish or break the transmission of power from the starting rotor of the power split device 20 to the rotating shaft 12a of the engine 12 is not limited to the clutch 30, as used in the first embodiment. For example, a one-way bearing of the same type as the one-way bearing 32 may alternatively be used. FIG. 24 illustrates a modification of the power transmission device of the first embodiment which is equipped with a one-way bearing 32 disposed between the starting rotor (i.e., the carrier C of the first planetary gear set 22) and the rotating shaft 12a of the engine 12.

The clutch 30 which works to block the transmission of power from the power split device 20 to the rotating shaft 12a of the engine 12 to start the engine 12 is not necessarily of a normally open type, but may be of a normally closed type.

The one-way bearing 34 is disposed between the power split device 20 and the engine 12 to establish the transmission of power to the power split device 20 when the speed of the rotating shaft 12a of the engine 12 relative to that of the power transmission rotor of the power split device 20 is not negative, however, a one-way clutch or another similar type working to have the power transmission axis follow the rotation of the rotating shaft 12a of the engine 12 with or without slip may be used instead.

The power transmission control mechanism working to establish or block the transmission of power between the engine 12 and the power transmission rotor of the power split device 20 under the condition that the speed of the rotating shaft 12a of the engine 12 relative to that of the power transmission rotor of the power split device 20 is not negative is not limited to the one-way power transmission mechanism. For example, a clutch similar to the clutch 30 may be used. In this case, the controller 40 may engage the clutch when the speed of the engine 12 is equal to that of the power transmission rotor of the power split device 20 to ensure the stability in connecting the rotating shaft 12a of the engine 12 and the power transmission rotor.

Figure 25:
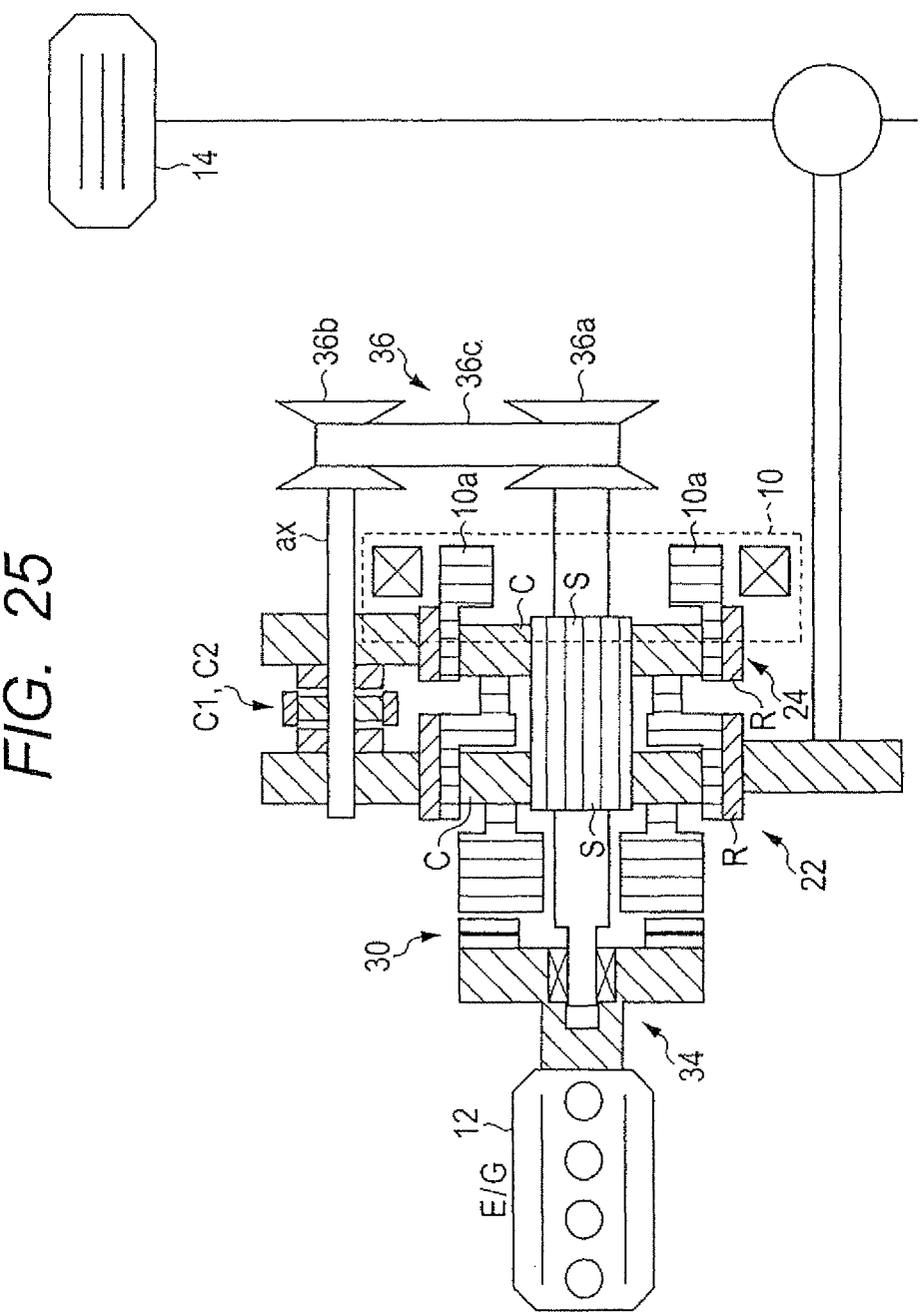
FIG. 25 is a sectional view which illustrates a modified form of the power transmission device of the first embodiment.

The power transmission device controls the operations of the clutches C1 and C2 independently from each other, however, the clutches C1 and C2 may alternatively be designed so that when one of the clutches C1 and C2 is engaged, the other of them is always disengaged. FIG. 25 illustrates such an example.

Each of the clutches C1 and C2 may not be of a hydraulically operated type. The ease of layout of the clutches C1 and C2 may be achieved by connecting them directly to the rotating shaft ax.

The advantages (1), (3) to (13), as discussed in the first embodiment, may be obtained even when the clutches C1 and C2 are not joined directly to the rotating shaft ax.

Figure 26:
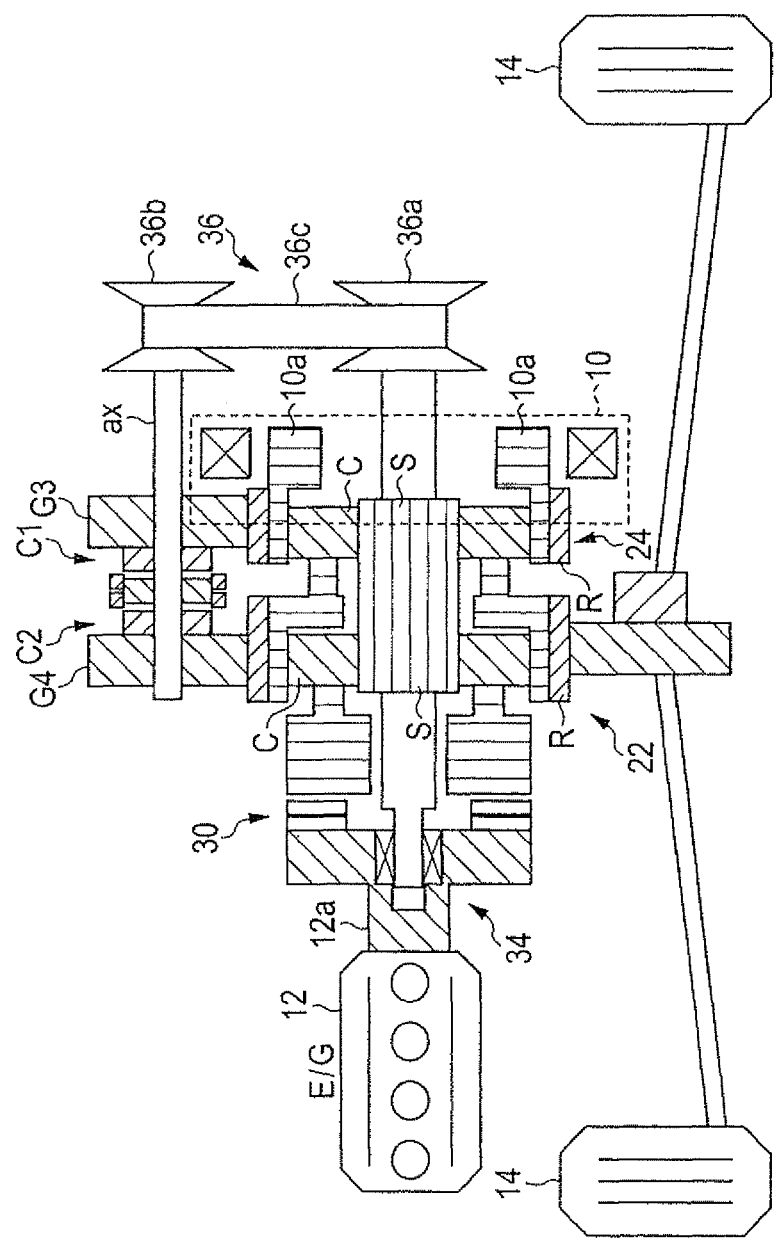
FIG. 26 is a sectional view which illustrates a modified form of the power transmission device of the first embodiment.

The power transmission device may be installed in the front-engine front-wheel drive (FF) vehicles as well as the front-engine rear-wheel drive (FR) vehicles. FIG. 26 illustrates the power transmission device of the second embodiment installed in the FF vehicle.

The power transmission device of the first embodiment may alternatively be designed to use the engine 12 as a power source to start the vehicle.

The power transmission device of the first embodiment uses either of the motor-generator 10 or the engine 12 as the power source in the second operation mode, however, may alternatively be designed to use both as the power source to supply the power to the vehicle. In this case, the rotational energy inputted from the motor-generator 10 to the ring gear R of the second planetary gear set 24 is outputted from the carrier C and the sun gear S. The rotational energy outputted from the sun gear S is transmitted to the driven wheels 14 through the CVT 36 along with the rotational energy outputted from the engine 12. The circulation of the power is, therefore, not induced.

The motor-generator 10 may be employed only as an electric generator when the engine 12 is being used to run the driven wheels 14. Specifically, the rotational energy outputted from the engine 12 is inputted to the second planetary gear set 24 from the sun gear S and the carrier C and then outputted to the motor-generator 10 from the ring gear R. A portion of the rotational energy from the engine 10 other than that inputted to the carrier C and the sun gear S is supplied to the driven wheels 14. The circulation of the power is not induced.

In the second to sixth embodiments, the air conditioner 44 is driven by the power supplied from the power split device 20, however, a brake pump may also be powered by the power split device 20. The power transmission device designed to establish the geared neutral is useful especially for an accessory which is required to be actuated when the driven wheel 14 are at rest.

The mechanical joints between the accessory (e.g., the air conditioner 44) and the rotor(s) of the power split device 20 are not limited to those in the second to sixth embodiments. It is, however, advisable that the accessory which is to be run even when the driven wheels 14 are at rest is coupled mechanically to one(s) of the rotors of the power split device 20 other than connected to the driven wheels 14.

The third to sixth embodiment may not have any accessory to be powered by the power split device 20.

The seventh embodiment may have an accessory. The accessory may be powered by the carrier C of the power split device 20. In this case, when the power transmission device enters the second operation mode, the motor-generator 10 is, like in the seventh embodiment, joined directly to the driven wheels 14. In the case where the accessory is powered by the sun gear S of the power split device 20, the power will be circulated between the carrier C and the ring gear R, but which may obtain benefits of turning the CVT 36 in the opposite direction.

Figure 27:
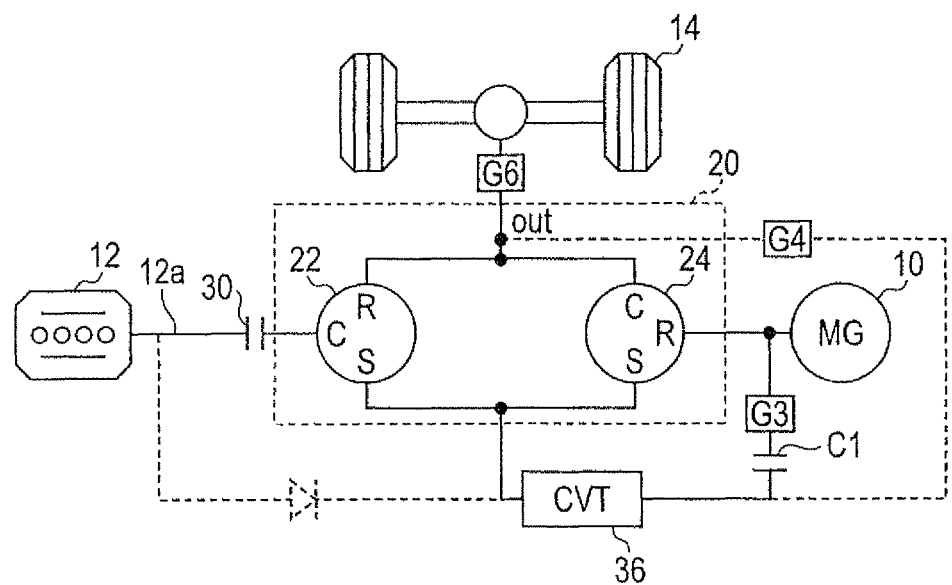
FIG. 27 is a block diagram which illustrates a modified form of the power transmission device of the first embodiment in an engine braking mode.

The structure of the power transmission device in each of the above embodiments is designed to permit the motor-generator 10 used to produce torque for starting the vehicle to be reduced in size thereof. Usually, the reduction in size of the motor-generator 10 (e.g., to several tens kW) may result in a difficulty in increasing the braking force produced by a regenerative operation of the motor-generator 10. This drawback may, however, be alleviated by applying the load torque of the engine 12 to the power split device 20 to create the engine braking in the hybrid vehicle of the first to third and sixth embodiments. FIG. 27 illustrates the hybrid vehicle of the first embodiment in which the engine braking is utilized in the first operation mode. Specifically, the clutch 30 is engaged to apply the load torque of the engine 12 to the carrier C of the first planetary gear set 22 to produce the braking force. At this time, the hybrid vehicle does not control the burning of the engine 12.

Instead of the speed variator (i.e., the CVT 36) or the gears, chains or belts may alternatively be disposed among the motor-generator 10, the engine 12, the driven wheels 14, and the power split device 20.

The power transmission devices in the above embodiments may be equipped with three or more electric rotating machines (i.e., generator-motors). In this case, the one or more electric rotating machines may be used only as an electric motor or an electric generator which is used to charge a high-voltage storage battery installed in the vehicle to supply the power to the motor-generator when working as an electric motor.

The electric rotating machine (i.e., the motor-generator 10) may alternatively be implemented by a DC motor with brushes, a brushless DC motor, or an induction motor instead of the three-phase AC motor.

The hybrid systems in the above embodiments may alternatively be designed to have two or more internal combustion engines.

The power transmission devices, as referred to above, may alternatively be designed for use in driving a crane mounted on a crane vehicle or in a drive system for an elevator.

The gear(s) (e.g., G1 to G6) used in the above embodiments is not always be a single gear itself, but may be implemented by a gear train or a gear assembly such as a gear body.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A power transmission apparatus comprising:
a power split mechanism equipped with a first, a second, and a third rotor which are operable to interlock with each other to split power to be outputted among the first, second, and third rotors and to output the power in the form of rotational energy, the first rotor being connected to a power source to receive input of power, as produced by the power source in the form of torque, the second rotor being connected to a power-driven member to output the power to the power driven member, said power transmission mechanism being so designed that a rotational speed of one of the first, second, and third rotors is dependent on those of remaining two of the first, second, and third rotors;
a first clutch which works to establish a mechanical connection between the first and second rotors through a first power transmission path bypassing the first, second, and third rotors, the first clutch additionally working to establish a mechanical connection of the second rotor to the power source;
a second clutch which works to establish a mechanical connection between the second and third rotors through a second power transmission path bypassing the first, second, and third rotors, the second clutch additionally working to establish a mechanical connection of the second rotor to the third rotor; and
a controller which works to control transmission of power between the power source and the power-driven member, said controller being operable selectively in a first operation mode and a second operation mode, in the first operation mode, said controller establishing the mechanical connection through said first clutch while blocking the mechanical connection through the second clutch, thereby connecting the first and second rotors together through the first clutch, in the second operation mode, said controller establishing the mechanical connection through the second clutch while blocking the mechanical connection through the first clutch, thereby connecting the second and third rotors together through the second clutch,
wherein a speed variator is coupled to the first and second clutches, respectively,
wherein the first operation mode is a mode in which the rotational energy outputted from the first rotor and the rotational energy outputted from the second rotor are opposite in sign to each other, so that the rotational energy, as outputted from one of the first and second rotors, is inputted to the other of the first and second rotors,
wherein the second operation mode is a mode in which the rotational energy outputted from the second rotor and the rotational energy outputted from the third rotor are identical in sign to each other, so that no rotational energy is circulated between the second and third rotors, and in which the rotational energy outputted from the second rotor is transmitted to the power-driven member,
wherein a gear is disposed between at least one of (i) the first rotor and the first clutch and (ii) the third rotor and the second clutch,
wherein the controller works to switch between the first operation mode and the second operation mode at a time when a speed ratio of the speed variator reaches a given ratio during continuous changing of the speed ratio of the speed variator, and in a condition where a speed of the first and second rotors to be connected by the first clutch is identical with that of the second and third rotors to be connected by the second clutch, and
wherein upon switching between the first and second operation modes, a total gear ratio that is a ratio of an input speed of rotation of the power source inputted to a power transmission path to an output speed of rotation outputted from the power transmission path to the power-driven member is constant, and the total gear ratio changes continuously with a change in gear ratio of the speed variator before or after switching between the first and second operation modes.

2. A power transmission apparatus as set forth in claim 1, further comprising a rotating shaft, the first clutch joined directly to the rotating shaft, and the second clutch joined directly to the rotating shaft, the rotating shaft being coupled mechanically to the second rotor of said power split mechanism and works to rotate with rotation of the second rotor, the first clutch working to connect the rotating shaft mechanically to the first rotor, the second clutch working to connect the rotating shaft mechanically to the third rotor.

3. A power transmission apparatus as set forth in claim 1, wherein when each of signs of rotational directions of the first and second rotors has a preselected one of positive and negative values, the rotational energies to be outputted from the first and second rotors are opposite in sign to each other in the first operation mode, while the rotational energies to be outputted from the second and third rotors are identical in sign with each other in the second operation mode or zero.

4. A power transmission apparatus as set forth in claim 3, wherein the power-driven member is coupled to the third rotor both in the first and second operation modes.

5. A power transmission apparatus as set forth in claim 1, wherein the power source is coupled mechanically to the first rotor both in the first and second operation modes, and wherein the power-driven member is coupled mechanically to the third rotor both in the first and second operation modes.

6. A power transmission apparatus as set forth in claim 1, wherein torque of the second rotor and the third rotor is proportional in magnitude to that of the first rotor, wherein the power source is coupled mechanically to the first rotor both in the first and second operation modes, and wherein the power-driven member is coupled mechanically to the third rotor both in the first and second operation modes.

7. A power transmission apparatus as set forth in claim 1, wherein said controller works to switch the first operation mode to the second operation mode, and wherein at least one of the first and second clutches includes a second mode-switching speed variator which serves to change a rotational speed of at least one of the second and third rotors so as to compensate for a difference in speed between the second and third rotors when the first operation mode is switched to the second operation mode to establish the mechanical connection between the second and third rotors.

8. A power transmission apparatus as set forth in claim 7, wherein said second mode-switching speed variator has a fixed output-to-input speed ratio.

9. A power transmission apparatus as set forth in claim 1, wherein at least one of the first and second connecting mechanisms including a first mode-switching speed variator which serves to change a rotational speed of at least one of the first and second rotors so as to compensate for a difference in speed between the first and second rotors when the second operation mode is switched to the first operation mode to establish the mechanical connection between the first and second rotors.

10. A power transmission apparatus as set forth in claim 9, wherein said first mode-switching speed variator has a fixed output-to-input speed ratio.

11. A power transmission apparatus as set forth in claim 1, wherein said power split mechanism includes a planetary gear set equipped with a sun gear, a carrier, and a ring gear which serve as the first, second, and third rotors.

12. A power transmission apparatus as set forth in claim 1, wherein said power split mechanism includes a first planetary gear set equipped with a sun gear, a carrier, and a ring gear and a second planetary gear set equipped with a sun gear, a carrier, and a ring gear, wherein two of the sun gear, the carrier, and the ring gear of the first planetary gear set are coupled mechanically to two of the sun gear, the carrier, and the ring gear of the second planetary gear set, and wherein the sun gears the carriers and the ring gears of the first and second planetary gear sets are broken down into four groups which have rotation speeds different from each other, the three rotors of the power slit device belonging to three of the four groups.

13. A power transmission apparatus as set forth in claim 1, wherein the first, second, and third rotors of the power split mechanism are implemented by a side gear, a pinion gear, and a ring gear of a differential gear.

14. A power transmission apparatus as set forth in claim 1, wherein the power source is a main engine mounted in an automotive vehicle, and the power-driven member is a driven wheel of the automotive vehicle.

15. A power transmission apparatus as set forth in claim 14, wherein the power source is implemented by an electric rotating machine and an internal combustion engine, wherein the first, second, and third rotors are so linked that rotational speeds thereof have a linear relationship, wherein said power split mechanism also includes a fourth rotor having a rotational speed with the linear relationship, and further comprising a first power transmission control mechanism which works to selectively establish and block transmission of the power from one of the first to fourth rotors which serves as a starting rotor to start the internal combustion engine to the internal combustion engine and a second power transmission control mechanism which works to selectively establish and block transmission of the power from the internal combustion engine to one of the first to fourth rotors which serves as a power transmission rotor and is other than the starting rotor.

16. A power transmission apparatus as set forth in claim 15, wherein the first power transmission control mechanism includes an electronically controlled breaker which works to break transmission of the power between the starting rotor and a rotating shaft of the internal combustion engine.

17. A power transmission apparatus as set forth in claim 16, wherein the first power transmission control mechanism also includes a one-way transmission mechanism which transmits the power to the internal combustion engine under a condition that a rotational speed of the starting rotor relative to that of the rotating shaft of the internal combustion engine is not negative.

18. A power transmission apparatus as set forth in claim 15, wherein the second power transmission control mechanism includes a one-way transmission mechanism which transmits the power from the internal combustion engine under a condition that a rotational speed of the rotating shaft of the internal combustion engine relative to that of the power transmission rotor is not negative.

19. A power transmission apparatus as set forth in claim 15, wherein an absolute value of the rotational speed of the starting rotor is smaller than or equal to that of the rotational speed of the power transmission rotor.

20. A power transmission system for a vehicle comprising:
a power transmission apparatus as set forth in claim 15; and
a load torque applying mechanism which works to control an operation of the first power transmission mechanism to apply a load torque of the internal combustion engine to the starting rotor when it is required to brake the vehicle.

21. A power transmission apparatus as set forth in claim 1, wherein the speed variator is implemented by a continuously variable transmission.

22. A power transmission apparatus as set forth in claim 1, wherein the rotational speeds of all of the first, second and third rotors are identical with each other except when at least one of the rotational speeds is zero, and further comprising means for compensating for a difference speed between the first rotor and the second rotor upon switching from the second operation mode to the first operation mode and for compensating for a difference speed between the second rotor and the third rotor upon switching from the first operation mode to the second operation mode.

23. A power transmission apparatus as set forth in claim 1, wherein the power transmission apparatus further comprises an internal combustion engine and the second rotor is connectable with the internal combustion engine.

24. A power transmission apparatus as set forth in claim 1, wherein the power source is a motor generator, the power split mechanism further comprises an internal combustion engine, and the power split mechanism further comprises:
a power split rotor set including a fourth rotor, a fifth rotor and a sixth rotor, wherein the fourth rotor is connected to the third rotor and a driven wheel, the fifth rotor is connected to the second rotor and is connectable with the third rotor and the fourth rotor through the second clutch, the fifth rotor is connectable with the internal combustion engine through the second clutch, and the sixth rotor is connectable with the internal combustion engine.

\* \* \* \* \*